US010374451B2

(12) United States Patent
Curlett

(10) Patent No.: US 10,374,451 B2
(45) Date of Patent: Aug. 6, 2019

(54) HYBRID POWER SOURCE LIGHTING AND ENERGY MANAGEMENT SYSTEM FOR OPERATION IN HARSH AND/OR REMOTE LOCATIONS

(71) Applicant: HORIZON OILFIELD SOLUTIONS INC., Rockyview (CA)

(72) Inventor: Joshua Curlett, Calgary (CA)

(73) Assignee: CLEANTEK INDUSTRIES INC., Rockyview (CA)

( * ) Notice: Subject to any disclaimer, the term of this patent is extended or adjusted under 35 U.S.C. 154(b) by 271 days.

(21) Appl. No.: 14/434,543

(22) PCT Filed: Oct. 9, 2013

(86) PCT No.: PCT/CA2013/000865
§ 371 (c)(1),
(2) Date: Apr. 9, 2015

(87) PCT Pub. No.: WO2014/056086
PCT Pub. Date: Apr. 17, 2014

(65) Prior Publication Data
US 2015/0280489 A1 Oct. 1, 2015

Related U.S. Application Data

(60) Provisional application No. 61/711,671, filed on Oct. 9, 2012.

(51) Int. Cl.
*H02J 7/00* (2006.01)
*H02J 9/06* (2006.01)
(Continued)

(52) U.S. Cl.
CPC .................. *H02J 9/06* (2013.01); *F21L 4/08* (2013.01); *F21L 13/00* (2013.01); *H02J 7/007* (2013.01);
(Continued)

(58) Field of Classification Search
CPC .......... H01F 7/02; H01F 7/021; C08L 101/00; H02J 5/005; H02J 50/12; H03H 7/40
See application file for complete search history.

(56) References Cited

U.S. PATENT DOCUMENTS

| 5,003,941 A | 4/1991 | Jeffrey, Jr. et al. |
| 5,806,963 A | 9/1998 | Miller et al. |

(Continued)

FOREIGN PATENT DOCUMENTS

| CA | 2 820 968 A1 | 9/2013 |
| CA | 2851391 A1 | 4/2014 |

(Continued)

OTHER PUBLICATIONS

CA 2851391 A1. The reference has been cited in the International Search Report under Category Y as being relevant to claims 1-41. The reference in English is attached.

(Continued)

*Primary Examiner* — Sibin Chen
(74) *Attorney, Agent, or Firm* — McGlew and Tuttle, P.C.

(57) ABSTRACT

The invention relates to a portable, skid mounted, wheeled and/or collapsible hybrid-power lighting and energy management system for harsh, remote and/or high latitude locations. The system combines an internal combustion engine (ICE) power source with a control system for providing power to light system. The system may also include a battery storage system, an ICE heating system and/or renewable solar and/or wind power systems in a manner that improves efficiency and reliability of operation in such locations, while preserving and improving functionality of operation and significantly reducing operator interaction during set-up and operation.

37 Claims, 20 Drawing Sheets

(51) Int. Cl.
*H02J 7/14* (2006.01)
*H02J 7/35* (2006.01)
*H02J 9/00* (2006.01)
*H02J 9/08* (2006.01)
*H05B 33/08* (2006.01)
*H05B 37/02* (2006.01)
*F21L 4/08* (2006.01)
*F21L 13/00* (2006.01)

(52) U.S. Cl.
CPC .............. *H02J 7/14* (2013.01); *H02J 7/1415* (2013.01); *H02J 7/35* (2013.01); *H02J 9/00* (2013.01); *H02J 9/08* (2013.01); *H05B 33/0803* (2013.01); *H05B 33/0845* (2013.01); *H05B 37/02* (2013.01); *H05B 37/0218* (2013.01); *Y02B 10/72* (2013.01); *Y02E 10/766* (2013.01); *Y10T 307/625* (2015.04)

(56) References Cited

U.S. PATENT DOCUMENTS

| | | | |
|---|---|---|---|
| 6,608,393 | B2 | 8/2003 | Anderson |
| 6,624,533 | B1 | 9/2003 | Swanson et al. |
| 6,805,462 | B1 | 10/2004 | Smith et al. |
| 7,242,150 | B2 | 7/2007 | Dejonge et al. |
| 7,583,056 | B2 | 9/2009 | Chiang et al. |
| 7,629,699 | B2 | 12/2009 | Annen et al. |
| 7,781,902 | B2 | 8/2010 | Cerney et al. |
| 7,893,346 | B2 | 2/2011 | Nachamkin et al. |
| 7,940,010 | B2 | 5/2011 | Patterson |
| 7,988,320 | B2 | 8/2011 | Brumels |
| 8,337,359 | B2 | 12/2012 | Hofbauer |
| 8,350,482 | B2 | 1/2013 | Nevins |
| 8,362,648 | B2 | 1/2013 | Matsui et al. |
| 8,371,074 | B2 | 2/2013 | Grant |
| 8,467,200 | B2 | 6/2013 | Pan et al. |
| 8,648,495 | B2 | 2/2014 | Chou et al. |
| 9,000,612 | B2 | 4/2015 | Choi |
| 2005/0024493 | A1* | 2/2005 | Nam ................ G08B 13/19619 348/143 |
| 2005/0264265 | A1 | 12/2005 | Iijima et al. |
| 2006/0131978 | A1 | 6/2006 | Hirzel et al. |
| 2006/0272605 | A1 | 12/2006 | Wright et al. |
| 2007/0182158 | A1 | 8/2007 | Cerney et al. |
| 2007/0285270 | A1* | 12/2007 | Gunn ................ G08B 13/19602 340/693.6 |
| 2008/0066724 | A1* | 3/2008 | Klingebiel ............. F01P 7/167 123/568.12 |
| 2009/0008374 | A1 | 1/2009 | Fosbinder |
| 2009/0071178 | A1* | 3/2009 | Major ................ B60H 1/00278 62/239 |
| 2009/0128097 | A1 | 5/2009 | Esnard |
| 2009/0268441 | A1 | 10/2009 | Chen |
| 2010/0039792 | A1* | 2/2010 | Meyers ..................... F21L 2/00 362/20 |
| 2010/0078942 | A1 | 4/2010 | Bois |
| 2010/0220467 | A1 | 9/2010 | Daidone et al. |
| 2010/0232148 | A1 | 9/2010 | Sharpley et al. |
| 2010/0236160 | A1 | 9/2010 | Quinet et al. |
| 2011/0033293 | A1* | 2/2011 | Cavalieri .................. F03D 7/02 416/9 |
| 2012/0025771 | A1* | 2/2012 | Bhardwaj ............... H02J 7/047 320/128 |
| 2012/0056436 | A1 | 3/2012 | Russell et al. |
| 2012/0193988 | A1 | 8/2012 | Eshrich et al. |
| 2012/0201015 | A1 | 8/2012 | Robertson et al. |
| 2012/0201016 | A1* | 8/2012 | Robertson ................ F21L 4/08 362/183 |
| 2012/0206087 | A1 | 8/2012 | Carpoff |
| 2012/0209463 | A1* | 8/2012 | Gibbs ...................... B60K 6/46 701/22 |
| 2012/0301755 | A1 | 11/2012 | Axelsson et al. |
| 2012/0330488 | A1 | 12/2012 | Sadler |
| 2013/0015783 | A1* | 1/2013 | Herbst ................ H05B 37/034 315/297 |
| 2013/0057158 | A1 | 3/2013 | Josefowicz et al. |
| 2013/0099576 | A1 | 4/2013 | Chuah et al. |

FOREIGN PATENT DOCUMENTS

| | | |
|---|---|---|
| GB | 2 434 928 A | 8/2007 |
| GB | 2 445 656 A | 7/2008 |
| RU | 78012 U1 | 11/2008 |
| WO | 20121050462 A2 | 4/2012 |

OTHER PUBLICATIONS

U.S. Pat. No. 8,648,495 B2. The reference has been cited in the International Search Report under Category Y as being relevant to claims 1, 2 and 41.

US 2013057158 A1. The reference has been cited in the International Search Report under Category Y as being relevant to claims 33 and 36.

U.S. 7,583,056 B2. The reference has been cited in the International Search Report under Category Y as being relevant to claims 34 and 35.

U.S. Pat. No. 7,242,150 B2. The reference has been cited in the International Search Report under Category Y as being relevant to claim 37.

U.S. Pat. No. 7,940,010 B2. The reference has been cited in the International Search Report under Category Y as being relevant to claims 38-40.

U.S. Pat. No. 7,781,902 B2, which has been previously disclosed in the Information Disclosure Statement of September 25, 2015. The reference has been cited in the International Search Report under Category Y as being relevant to claims 1, 2 and 41.

* cited by examiner

HYBRID POWER SOURCE LIGHTING AND ENERGY MANAGEMENT SYSTEM FOR OPERATION IN HARSH AND/OR REMOTE LOCATIONS

FIELD OF THE INVENTION

The invention relates to a portable, skid mounted, wheeled and/or collapsible hybrid-power lighting and energy management system for harsh, remote and/or high latitude locations. The system combines an internal combustion engine (ICE) power source with a control system for providing power to light system. The system may also include a battery storage system, an ICE heating system and/or renewable solar and/or wind power systems in a manner that improves efficiency and reliability of operation in such locations, while preserving and improving functionality of operation and significantly reducing operator interaction during set-up and operation.

BACKGROUND OF THE INVENTION

Portable light towers have been used extensively for lighting of a wide range of locations including construction sites, oil and gas drilling sites, stadiums, mines, military zones and a large number of other locations and applications.

In cases where these systems are operated in remote locations, there are two primary concerns associated with the effective deployment and operation of such equipment including a) the delivered cost of fuel and b) the reliability of the fuel supply chain. That is, delivering fuel to a remote location substantially increases the cost of fuel often by several multiples as compared to deployment of the same equipment in a non-remote setting. As can be appreciated, the increase in delivery costs is due to increased equipment and personnel costs required to transport and deliver fuel to locations where it takes time and specialized equipment to get it to the remote location. Similarly, reliability of the supply chain to various locations such as military zones, remote drilling sites and mines can result in direct and indirect costs resulting from the inability and/or time to physically deliver fuel to a location to run equipment at the site.

Historically, light towers have been powered by internal combustion engines (ICEs) that consume fuel to generate the electricity required to power the lights. Typically, these engine-powered light towers, in addition to providing nighttime lighting, may also be used to generate auxiliary power for other equipment at an off-grid location. In many of these systems, ICE-powered light towers are manually operated, requiring an operator to turn the system on and off as desired. In addition, with certain systems an operator will have to monitor and supply fuel, perform regular oil changes as well as other maintenance that will be required due to the high run times of the engine. Generally, the high engine run times are simply accepted in the industry as the cost of doing business in a remote location because there is no alternative.

The typical portable light tower of the prior art will include a trailer and/or frame for supporting an ICE and its associated fuel tank and one or more light standards that pivot with respect to the trailer for elevating one or more lighting fixtures above the ground. In the past, various types of incandescent bulbs have been the predominant type of bulb used in such light towers.

As is known, in addition to the increased costs associated with operating equipment at a remote location, there are several other drawbacks with these lighting systems. These include:
 noisy operation at night;
 high fuel consumption;
 inability to operate due to fuel shortages or delays;
 impact of weather on refueling schedules in remote or high latitude locations;
 high carbon footprint;
 toxic emissions;
 no controller, instead having switches, toggles and buttons;
 engine service requirements particularly resulting from the high run time hours and/or operation in cold climates;
 increased maintenance costs due to operation in a remote location;
 inefficient operation particularly during cold weather where ICEs may need to be run during daylight hours to maintain ICE warmth to ensure nighttime reliability; and
 high personnel costs due to the complexity of system set-up and the time required for manual operation and/or operator supervision.

In response to the fuel consumption, fuel costs and emissions drawbacks, attempts have been made to reduce the carbon footprint and fuel consumption of mobile lighting systems by employing the use of solar and/or wind power. However, while some localized savings can be achieved by systems incorporating secondary power sources, the efficiency and/or reliability of these secondary sources of power can simply create other operational problems. Moreover, on a practical scale such systems are generally unable to provide sufficient power to power metal halide light bulbs that are commonly used in traditional ICE powered mobile lighting systems.

More recently, developments in light emitting diode (LED) lights and improvements in the efficiency of wind and light mining technologies have enabled more widespread and economic use of such secondary or renewable power sources for the operation of light towers. More specifically, LED lights are available that can produce similar light, measured in lumens and/or light throw that consume a fraction of the energy that an incandescent bulb would consume. That is, an LED light will typically require 70-85% less energy than an equivalent incandescent bulb. However, while LED's reduce energy draw, the operator will typically only realize an approximate 30-40% reduction in fuel cost if LED lights are simply installed on a standard light tower in place of metal halide bulbs because ICE operation remains inefficient relative to the energy requirements of the bulbs and with respect to the overall management of energy at a remote site.

This can be illustrated by way of a typical operating example. In a typical scenario where there is a requirement for a 12 hour night time light energy draw, an ICE powering the LEDs will remain on during the 12 hour nighttime period. In a lighting system where incandescent bulbs have been replaced with LED lights, it is known that only about a 30% savings in fuel consumption is seen as a result of the reduced power load due to the minimum threshold of fuel required to idle the ICE. That is, the savings in fuel are not linear to the power reduction resulting from the use of the LEDs. Additionally, the ICE runtime in this example has not been reduced at all and therefore there is no maintenance or wear and tear reduction or personnel costs associated with running an LED light tower.

Importantly, there continue to be improvements in solar cell efficiencies and wind turbine technologies allowing for more efficient recovery of these renewable energy sources on a reasonable cost basis. That is, on a capital cost basis, the unit power cost from solar and wind sources have improved significantly.

As a result, the industry has seen the development of LED light towers outfitted with solar panels or wind turbines that, in certain circumstances depending on location, available solar-light or wind, length of draw during nighttime, etc., can be self-sufficient as a lighting system only. Unfortunately there are number of drawbacks with these systems that make these systems unreliable or unusable in a number of operational situations, and particularly in remote, harsh and cold climates.

For example, the length of days in each season is important in both high and low latitude climates to be able to operate lighting systems using renewable energy. That is, in climates along the equator, for half the year there is often cloud cover due to the rainy seasons, or equipment may be located in wet or rainforest environments. Similarly, at higher latitudes, at times of the year with short days (i.e. winter), there is not enough time during the day to generate energy (at a reasonable cost and footprint) using solar powered lighting systems for the correspondingly longer nights when the energy is drawn as well as there being limits on the maximum energy that can be stored in an economically sized battery bank. Further still, because these are mobile lighting systems that must be transported to remote sites, often along very rough roads, there are size restrictions for all components that do not enable operators to simply increase the size of renewable energy collection equipment. That is, there is limited surface area available on the structure for solar panels which thereby limits the amount of solar power that can be collected in a given time period. As such, solar systems are generally not suitable for climates where the ratio of light power generating hours to night-time energy drawing hours is not favorable or where during certain times of the year such as a rainy season there is limited good quality solar light. Similarly, the reliability of wind power in many locations is not sufficient to enable the long term use of this energy source.

Furthermore, with regards to solar power, local weather conditions may not be favorable for considerable time periods, as there may be considerable cloud cover and/or precipitation at times. In cold climates, large amounts of snow may accumulate on the surface of the solar panels, preventing or reducing the amount of sun's rays that reach the solar panel. Geographic features at a particular location may also not be favorable. That is, when there is no wind, cloud cover and/or geographic features such as trees or hills can prevent or greatly reduce power generation when daytime battery bank charging must occur.

This is of particular importance on drilling leases in northern and mountainous areas or climates. For example, if a drilling lease is located on the north facing slope of a hill or mountain, in a high northern latitude there may be no direct sunlight to the location. Another example is drilling leases that are cut out in dense forest areas where particularly in the winter months the days are not only short, but the sun's trajectory along the horizon may also prevent direct sunlight from piercing the forest to the base of the light system where the solar panels are located.

As drilling equipment will typically be moved from site to site in these remote locations, the operator will often have to choose between incurring higher costs to purchase both an ICE system and a solar system (to have the ability to utilize solar when available but have the ICE as a reliable backup) or have a single ICE system reliable in all operations (but then have no ability to capture renewable power when available).

Further, in many cases there is a desire for lighting systems to also provide auxiliary power. However, current solar systems have no ability to provide power for the operation of ancillary equipment. That is, even during long sunny summer days, due in part to the limited available space for solar panels on a mobile system, a light tower may only be able to absorb enough energy on a given day to supply the lighting for that night thus leaving little to no extra energy to power ancillary equipment. Thus, as light towers traditionally have the dual purpose of supplying power to the lighting fixture as well as supplying power and/or backup power to ancillary equipment, a significant drawback of solar and wind powered light towers is that they are limited to only lighting and only in certain geographic locations and only in certain environmental conditions. This drawback eliminates the ability of an operator to reduce their carbon footprint, because in order to do so they would have to sacrifice functionality.

As noted above, specifically in harsh, remote and/or cold environments, solar and/or wind systems have not been capable of reliably supplying lighting systems for these environments. Further still, in the harsh environment of northern latitudes (e.g. northern Canada or Alaska), particularly during the winter season with reduced daylight hours, another operational issue is that such systems are often affected by reduced battery performance due to the cold, snow cover of solar panels and/or the risk of moving parts of a wind turbine (for example) becoming frozen. Use of stored power for heating devices within the system that may allow such systems to operate reliably in cold climates will almost always exceed the available power from renewable sources alone.

Another factor affecting the implementation of solar and/or wind-powered systems is the economics of utilizing new technology to reduce an operator's carbon footprint. While an operator may wish to reduce their carbon footprint, the cost of doing so in a meaningful way is generally prohibitive. For example, with current technology, an operator would have to invest in the purchase of both an ICE system in order to run ancillary equipment and/or to ensure the system will run reliably in the winter as well as a solar/wind system to try and reduce fuel cost and carbon footprint.

Further still, operators desire portable light tower systems that are compact to transport as well as simple and quick to set up and take down, requiring minimal knowledge, training and time on the part of the operator. Wind turbines are typically very strong and sturdy to withstand high winds. As such, wind turbines are generally not easily transportable, and they can be difficult and time-consuming to set-up and take down. An operator often has to perform many time-consuming steps to set up and take down a wind turbine. Harsh weather conditions including strong winds, cold temperatures and rain/snowfall, can make it more difficult and dangerous to handle and manipulate a wind turbine.

Further still, cold weather adversely affects the starting of an ICE system, particularly a diesel engine. As diesel engines heat a fuel/air mixture by compression, it becomes increasingly difficult to achieve ignition temperature as ambient temperatures fall. Furthermore, diesel fuels often gel at cold temperatures, and lubricating oils become more viscous and can impede rather than lubricate moving parts. As such, ICE systems can become virtually unstartable when temperatures fall much below freezing, which is why they are often kept idling continuously in cold weather. As can be appreciated, continuously idling an engine is not fuel-efficient as it continually requires fuel, resulting in a higher carbon footprint and increased toxic emissions, as well as increased sound pollution.

Cold temperatures can also adversely affect battery banks by decreasing the time period a battery can hold its charge and shortening the lifespan of the batteries. A desired operating temperature for a lead acid battery is generally 25° C. to 40° C., and for a lithium ion battery is 0° C. to 40° C. At −15° C., a typical deep-cycle absorbed glass mat (AGM) battery can lose 30-50% or more of its charge. This is important to note because when solar may already be limited due to solar panel footprint or environmental conditions, losses in the overall systems due to the cold effect on batteries (or other losses such as line losses, etc.) can void the benefit gained by solar input.

As a result, there has been a need to develop mobile lighting systems that overcome many of the above problems and particularly that enable the deployment of light towers in more remote and/or higher latitude locations with increased reliability, reduced ICE run time, lower fuel consumption without sacrificing light at the job site, reduced human interaction, reduced carbon footprint, improved overall reliability and lower ongoing costs. More specifically, there has been a need for lighting systems that require less operator involvement, that utilize an intelligent control system (ICS) that allows the portable lighting system to operate and manage energy in a way that reduces fuel in better relation to the reduced draw of the LED's. Additionally, there is a need for a portable lighting system with an ICS that utilizes renewables while preventing system losses what would otherwise void the value of solar and or wind inputs for harsh, remote and/or high/low latitude environments.

Further still, there has been a need for systems that can utilize a combination of renewable energy sources on a primary basis, whenever available to power the lighting and/or heating system that is combined with fuel combustion systems for generating power that is used on a supplementary basis or on demand to power both the lighting/heating system as well as ancillary equipment. Importantly, such systems would provide benefits that include:

less ICE run time;
less need for/dependence on personnel, and/or environmental conditions for fuel resupply;
less need for/dependence on personnel as well as engine service/maintenance;
lower fuel cost due to an IEMS and ICS;
lower fuel costs due to efficient use of renewables;
lower fuel cost resulting from alternative heating systems;
lower personnel costs due to ICS functions, coding's, algorithms and feedback processes;
reduced carbon footprint due to maximizing the value of renewables and LED's thereby reducing fuel consumption;
extended life of the system due to less engine runtime which results in reduced wear and tear and ongoing operational costs;
extended operational reliability by intelligently selecting the resource input on an automated basis and/or selecting the power source based on loading needs;
ease of set up and take down of the system;
less personnel cost due to ICS feedback/communication to operator (e.g. rather than "unfocused & broad supervision" being "pushed" to the system by a human, the system will "pull" "focused & specific intervention" only when needed);
extended life of old used light towers through retrofitting with new equipment; and
quieter or silent night lighting operation through efficient battery bank charging during the day enabling silent running at night.

Further still, there has been a need for a method of running an ICE less frequently while still meeting total annual light production requirements when compared to standard non-solar, non-hybrid MH light towers. More specifically, there is a need for a method for more efficient charging and/or pulsing power from an ICE into a storage facility, such as a battery bank, allowing the ICE to charge the battery bank, store the energy and deliver it to the load or lights, as needed.

Further, there is a need for a system with various automated features, including user interface features that reduce the level of personnel involvement with the system. By way of example, in prior art systems, operators are required to frequently monitor prior art light towers, both standard and solar. As such, manpower is required for the operation of the prior art systems in a way that is bulky, inefficient and leaves room for human error that can result in system failures. For example, various prior art systems require the operator to constantly check for fuel to ensure the ICE will not shut down at an unscheduled time. In another example, prior art systems may require that the operator remember to turn the lights and/or ICE on and off at intervals throughout the day, which if forgotten wastes fuel and ICE run time. In another example, various prior art solar towers may require the operator to manually set the timing of the lights-on schedule by timers which may also have to be adjusted to the changing schedule of sunrise and sunset in certain regions.

Thus, there has been a need for a system having an intelligent user interface that, rather than requiring operators to "push" volumes of manpower to the system, the system would "pull" manpower only when needed, in a specific and focused manner, thereby limiting personnel time and cost. Advantageously, this will reduce various problems including power loss due to running out of fuel and adapting the lighting schedule.

A review of the prior art indicates that past systems have been developed that provide particular functions but that do not provide systems enabling effective operation in remote, higher latitude and/or harsher climates. For example US2012/0206087A1; US2012/0201016A1; US2010/0232148A1; and U.S. Pat. No. 7,988,320 are examples of solar-powered lights and U.S. Pat. Nos. 6,805,462B1; 5,806,963 are examples of traditional ICE towers. U.S. Pat. No. 8,350,482; US 2010/0220467; and US 2009/0268441 are examples of non-portable hybrid lighting devices that utilize both solar and wind energy. U.S. Pat. No. 7,988,320, US 2010/0236160 and U.S. Pat. No. 8,371,074 teach wind masts that can be lowered to the ground. U.S. Pat. No. 5,003,941; US 2012/0301755 and US 2006/0272605 teach systems for heating engines and/or batteries.

SUMMARY OF THE INVENTION

In accordance with the invention, there is provided a portable hybrid lighting system having: a control system having at least one controller; at least one light system operatively supported by a mast and operatively connected to the control system; an internal combustion engine (ICE)

having a power generator, the ICE operatively connected to the control system and the ICE power generator for generating electrical power; a battery storage system operatively connected to the control system, the battery storage system for storing electrical power from the ICE and providing battery power wherein the control system has means for: monitoring a current state-of-charge (SOC) within the battery storage system; turning on the ICE to generate electrical power when the current SOC is below a lower SOC threshold or based on an operator programmed start time; turning off the ICE when battery power is above an upper SOC threshold or when an operator programmed runtime has been achieved; directing ICE power to charge the battery system between the lower and upper SOC thresholds or operator programmed runtimes; and directing ICE or battery power to the light system if required, wherein the control system controls charging of the battery storage system in order to minimize ICE fuel consumption by prioritizing charging of the battery storage system between the upper and lower SOC thresholds.

In one embodiment, the control system includes a battery charging algorithm and the upper and lower SOC thresholds are the bulk stage of the battery charging algorithm and the battery charging algorithm only charges the battery system within the bulk stage of the battery charging algorithm defining a bulk charging cycle.

In one embodiment, the control system initiates a maintenance charging cycle after a pre-determined number of bulk charging cycles or a specific maintenance time and wherein the maintenance cycle charges the battery system to 100% SOC.

In one embodiment, the control system monitors the number of bulk charging cycles and the maintenance charging cycle is initiated after a pre-determined number of bulk charging cycles. The pre-determined number may be 10-100 bulk charging cycles. In one embodiment, the control system initiates a maintenance charging cycle after a pre-determined time period.

In one embodiment, the control system enables the battery system to be charged in a range between a lower threshold SOC and 100% SOC.

In another aspect, the system includes a renewable energy source operatively connected to the control system which may be any one of or a combination of solar power and wind power.

Preferably, the at least one light system is a light emitting diode (LED) light system.

The system may also include a heating system operatively connected to the ICE and/or control system for heating the ICE when the ICE is off.

The system may also include a battery heating system operatively connected to the battery storage system for heating the battery storage system to maintain the battery storage system within a temperature range. The heating system may be a coolant heater for circulating heated coolant to the ICE and the battery storage system.

In one embodiment, the heating system includes a valve between the coolant heater and the battery storage system for controlling the flow of heated coolant between the coolant heater and the battery storage system. The valve may be temperature-controlled.

In one embodiment, the control system includes means for monitoring the temperature of the ICE and/or the battery system and turning on and off the heating system when one or more threshold temperatures are reached or based on timer controlled schedule.

In one embodiment, the system includes a mast supporting a wind turbine having a telescoping shaft retractable within the mast. In one embodiment, the wind turbine includes: a rotor having at least one blade, the rotor rotatably and swivelably connected to the telescoping shaft; a rod attached to the rotor; and an angled plate attached to the mast and having a slot for receiving the rod and preventing the rotor from swiveling when the telescoping shaft is retracted, wherein the angled plate is designed to direct the rod into the slot by causing the rod and rotor to swivel. The angled plate may include at least one bumper extension oriented to contact the at least one blade as the telescoping shaft is retracted to prevent the at least one blade and rotor from rotating.

In one embodiment, the rotor comprises at least two blades, and the angled plate comprises at least one bumper extension for contact with one of the least two blades when the wind turbine is retracted.

In one embodiment, the system includes a base for supporting at least one array of solar panels, wherein the solar panels are pivotable about a horizontal axis on the base and preferably two arrays of solar panels on opposite sides of the base. In one embodiment, the base has at least one angled wall and the at least one array of solar panels is pivotably connected to the angled wall.

In various embodiments, the system may include a photocell connected to the at least one light for sensing ambient light levels and turning the at least one light off or on based on the ambient light level, a heat exchanger connected to the ICE for capturing and recycling heat released from the ICE for warming the ICE, an auxiliary load connection for connecting to and providing power to an auxiliary load, a grid power connector for connecting the hybrid lighting system to a power grid for receiving and delivering grid power to the light system and/or an auxiliary load, a network connection system for connecting the controller to a remote computer.

In another embodiment, the system further includes a user interface operatively connected to the control system, the user interface having a mast switch for raising and lowering the mast wherein when in the mast is in a lower position, any one or all of the ICE, lights or any component(s) of the control system is deactivated.

In one embodiment, the user interface further includes an engine activation switch operatively connected to the control system, the engine activation switch having an auto-run position for activating the control system to activate the ICE based on pre-determined operational parameters.

In one embodiment, the system includes at least one panel of solar panels and the system further comprises a user interface operatively connected to the control system, the user interface having a mast switch for raising and lowering the mast; at least one solar panel switch for raising and lowering each of the one or more solar panels; and an ICE activation switch operatively connected to the control system, the ICE activation switch having an auto-run position for activating the control system to activate the ICE based on pre-determined operational parameters and an ICE manual-run position allowing an operator to manually run the ICE as needed; and a light activation switch operatively connected to the control system, the light activation switch having a position for activating the lights based on pre-determined operational parameters.

In one embodiment, the system includes at least panel of solar panels and the system further includes a user interface operatively connected to the control system, the user interface having a mast switch for raising and lowering the mast;

at least one solar panel switch for raising and lowering each of the one or more solar panels; and an activation switch operatively connected to the control system, the activation switch having an auto-run position for activating the control system to activate the ICE based on pre-determined operational parameters and activate the lights based on pre-determined operational parameters and having manual-run position that starts the ICE which remains on while activating the lights based on the same pre-determined operational parameters as in the auto-run position.

In another aspect, the invention provides a method for controlling the energy input and output of a hybrid light tower having at least one light, an internal combustion engine (ICE), at least one renewable energy source, at least one controller, and at least one battery storage system, comprising the steps of: monitoring available power from the at least one renewable energy source and at least one battery storage system; switching on ICE power when available renewable energy power and/or battery power is low; charging the battery storage system when the ICE is on; and charging the battery storage system when renewable power is available.

In one embodiment, the method may include the step of monitoring the temperature of the ICE and/or the at least one battery storage system and turning on and off a heating and/or cooling system when temperature thresholds are reached.

In another embodiment, the method includes the steps of: monitoring a current state-of-charge (SOC) within the battery storage system; turning on the ICE to generate electrical power when the current SOC is below a lower SOC threshold; turning off the ICE when battery power is above an upper SOC threshold or when a programmed runtime has been achieved; directing ICE power to charge the battery system between the lower and upper SOC thresholds; and directing ICE or battery power to the light system if required wherein the control system controls charging of the battery storage system in order to minimize ICE fuel consumption by prioritizing charging of the battery storage system between the upper and lower SOC thresholds.

In another aspect, the invention provides a method for operator control of a hybrid lighting system having at least one light operatively connected to a mast system moveable between a lower and upper position, an internal combustion engine (ICE), at least one solar panel connected to the hybrid lighting system and moveable between deployed and non-deployed positions, a control system and at least one battery storage system operatively connected to a control system and ICE, the method comprising the steps of: deploying the solar panels to a deployed position by activation of a solar panel switch connected to the control system; deploying the mast system to an upper position by activation of a mast switch connected to control system; activating the hybrid lighting and ICE system by an activation switch operatively connected to the control system, the activation switch having an auto-run position for activating the control system to activate the ICE based on pre-determined operational parameters and wherein the control system prevents activation of the ICE if the mast is not in an upper position.

In a further aspect, the invention provides a portable hybrid lighting system including: a control system having at least one controller; at least one light system operatively supported by a mast and operatively connected to the control system; an internal combustion engine (ICE) having a power generator, the ICE operatively connected to the control system and the ICE power generator for generating electrical power; wherein the control system has programmable timing means enabling an operator to program times of operation of the ICE for providing power to the at least one light system including time when the ICE is on and the lights are on and time when the ICE is off and the lights are off.

In a further embodiment, the system further includes an ICE heating system operatively connected to the ICE for heating the ICE to maintain the ICE within a temperature range prior to start-up that may be a coolant heater.

BRIEF DESCRIPTION OF THE DRAWINGS

The invention is described with reference to the accompanying figures in which.

DETAILED DESCRIPTION OF THE INVENTION

Figure 1:
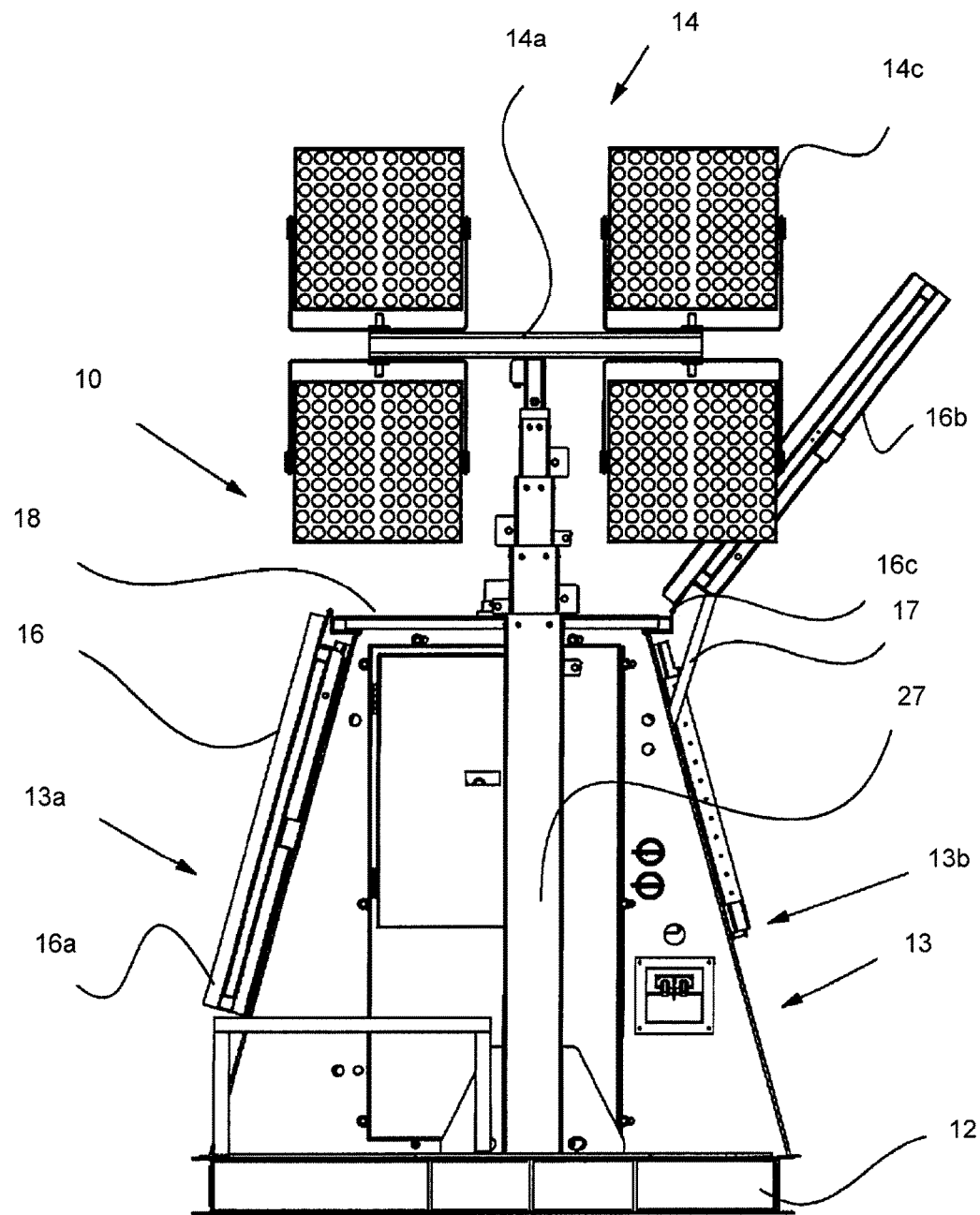
FIG. 1 is an end view of a skid-mounted hybrid light tower showing a light mast in a collapsed position and one solar panel in a deployed position in accordance with one embodiment of the invention.
Figure 2:
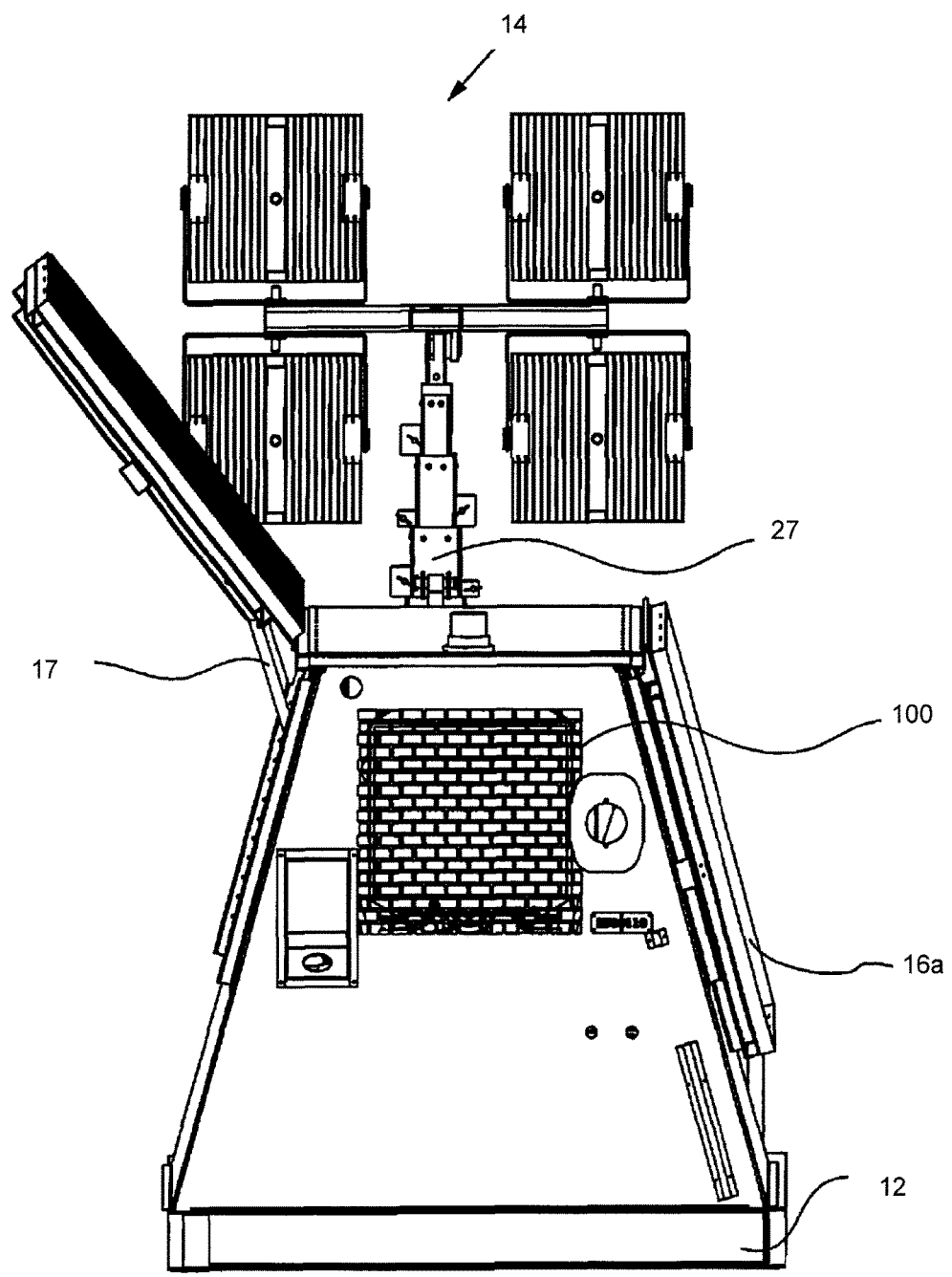
FIGS. 2 and 3 are side and front perspective views of a skid-mounted hybrid light tower showing a light mast in a collapsed position and one solar panel in a deployed position in accordance with one embodiment of the invention.
Figure 3:
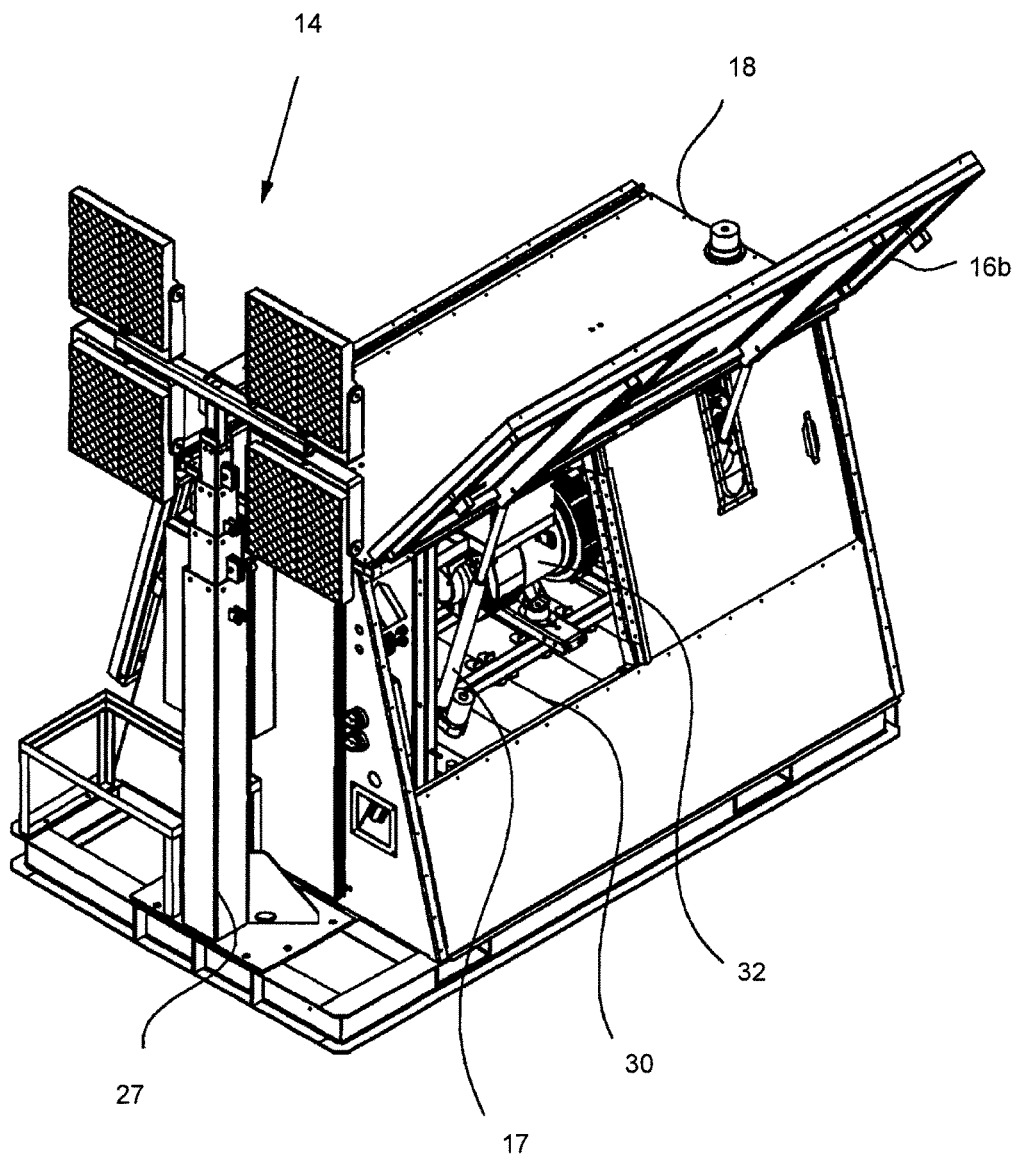
Figure 4:
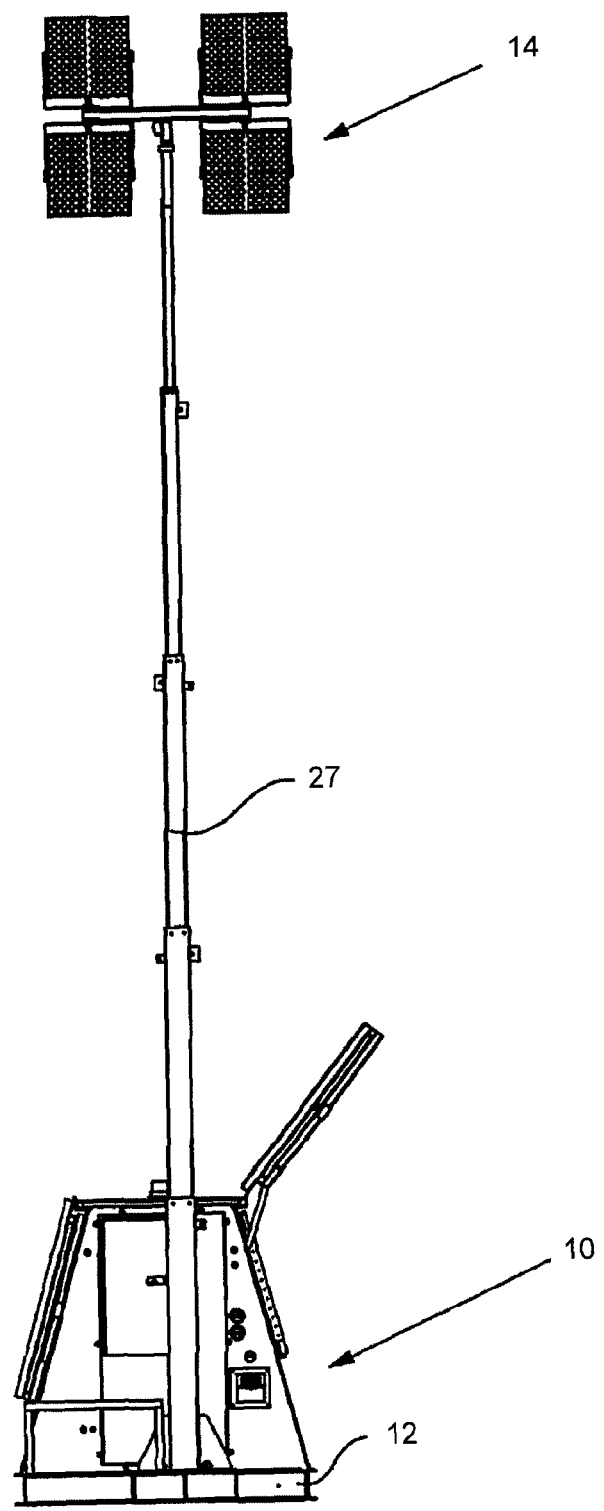
FIG. 4 is an end view of a skid-mounted hybrid light tower showing the light mast in an erected position and a deployed solar panel.
Figure 4A:
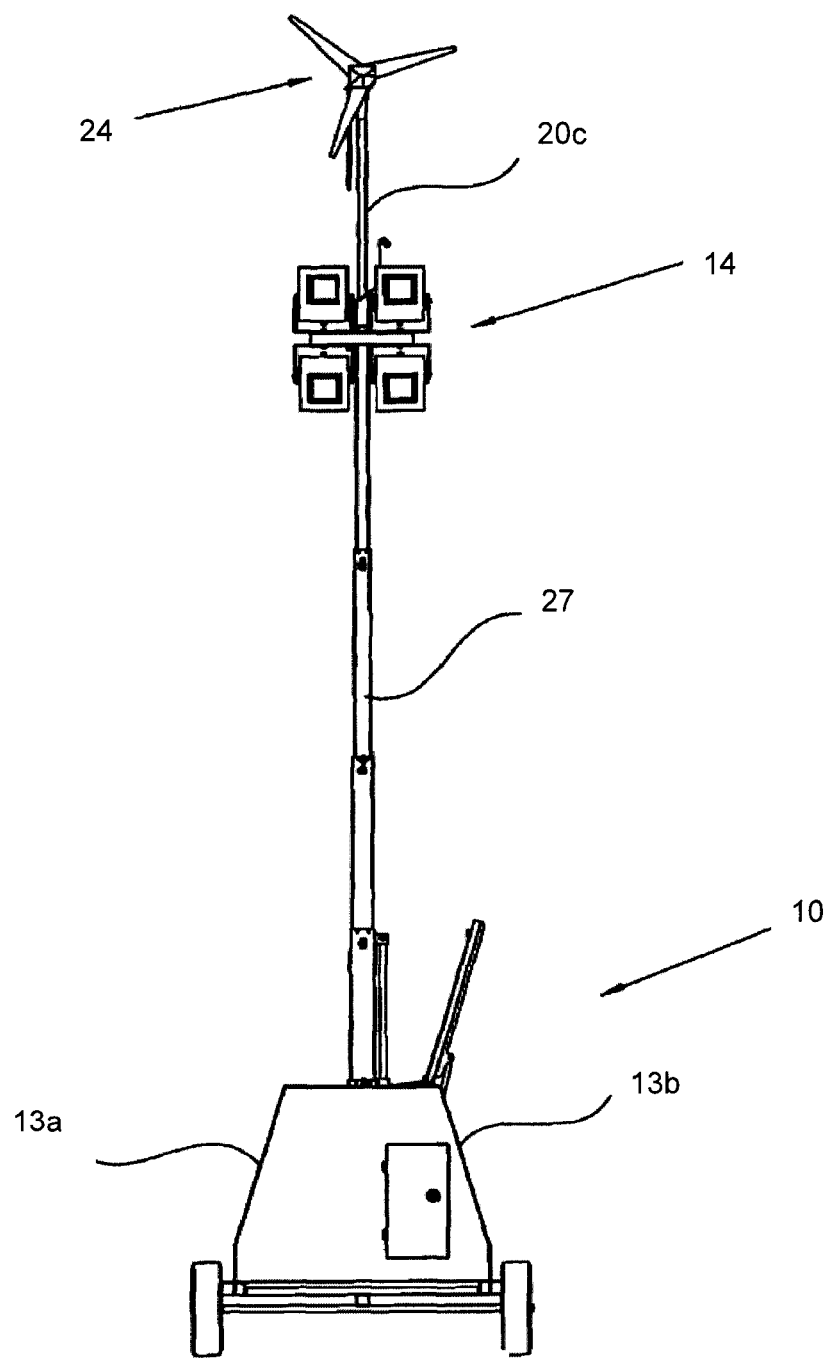
FIG. 4A is an end view of a trailer-mounted hybrid light tower with a windmill showing the light mast in an erected position and a deployed solar panel.
Figure 4B:
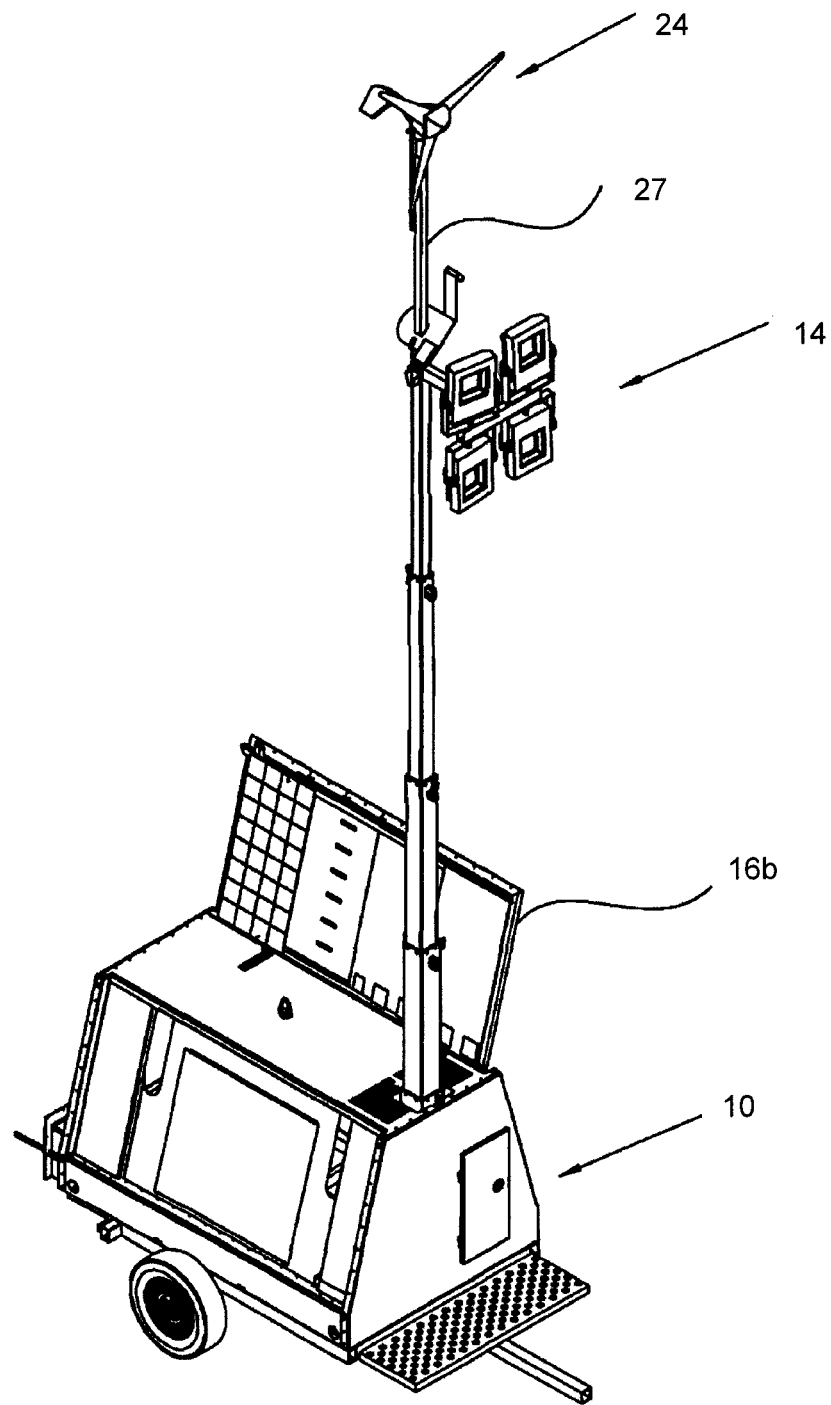
FIG. 4B is a perspective view of a trailer-mounted hybrid light tower showing the light mast in an erected position and a deployed solar panel in accordance with a wind-powered embodiment of the invention.
Figure 5:
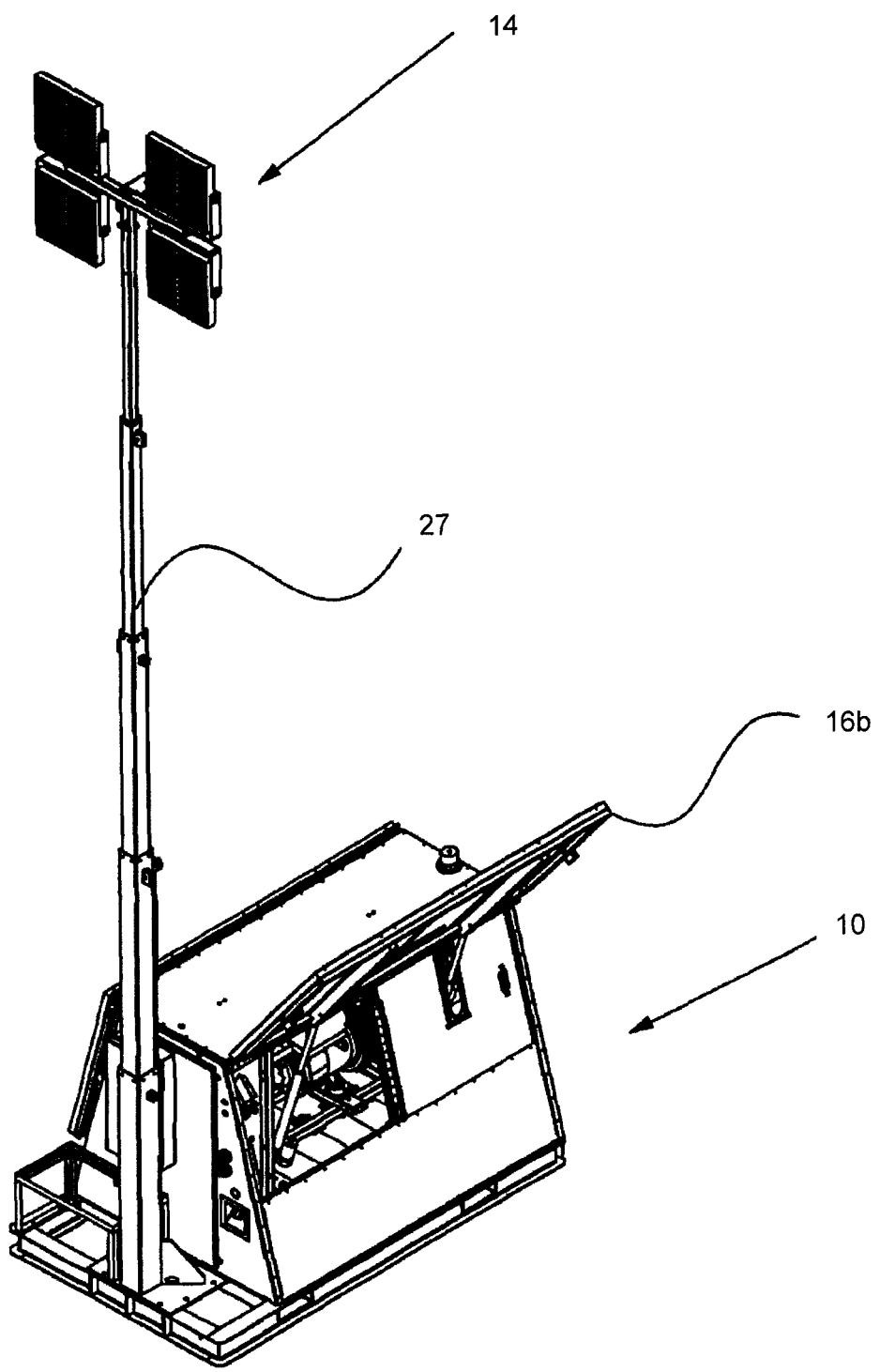
FIG. 5 is a perspective view of a skid-mounted hybrid light tower showing the light mast in an extended position in accordance with one embodiment of the invention.
Figure 5A:
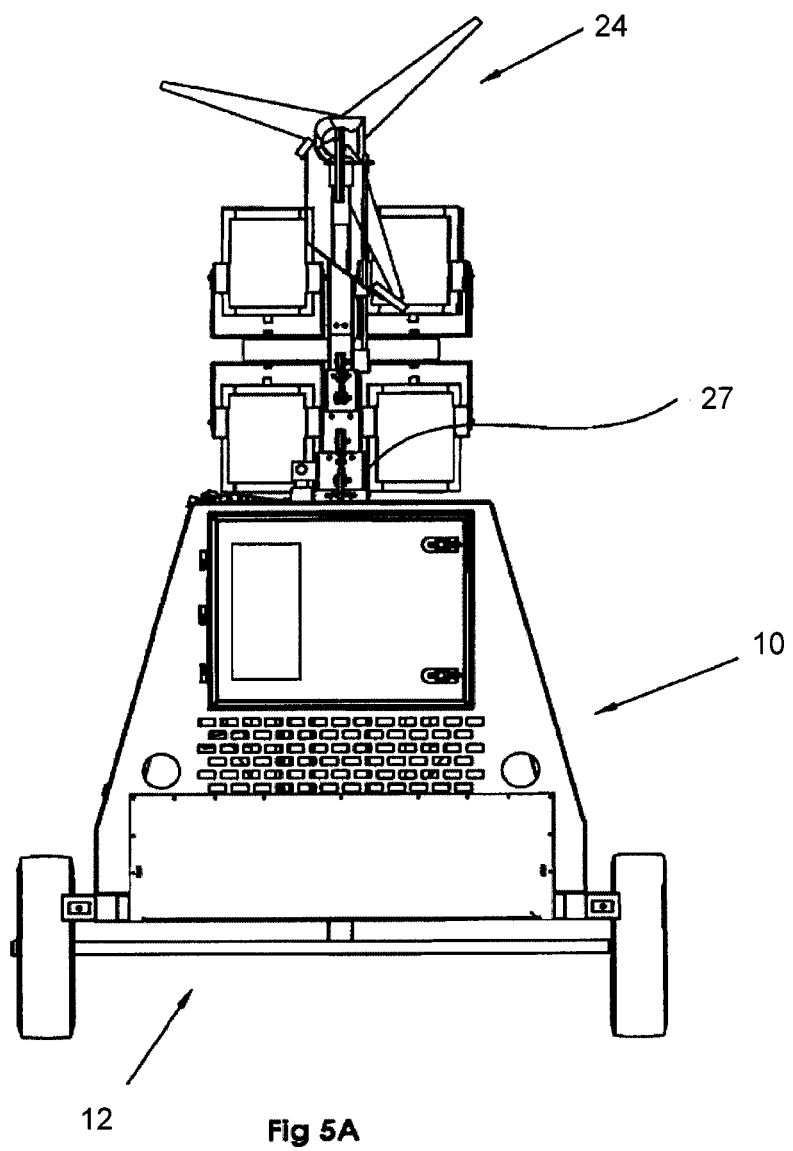
FIG. 5A is an end view of a trailer-mounted hybrid light tower showing the light mast in a retracted position in accordance with a wind-powered embodiment of the invention.
Figure 5B:
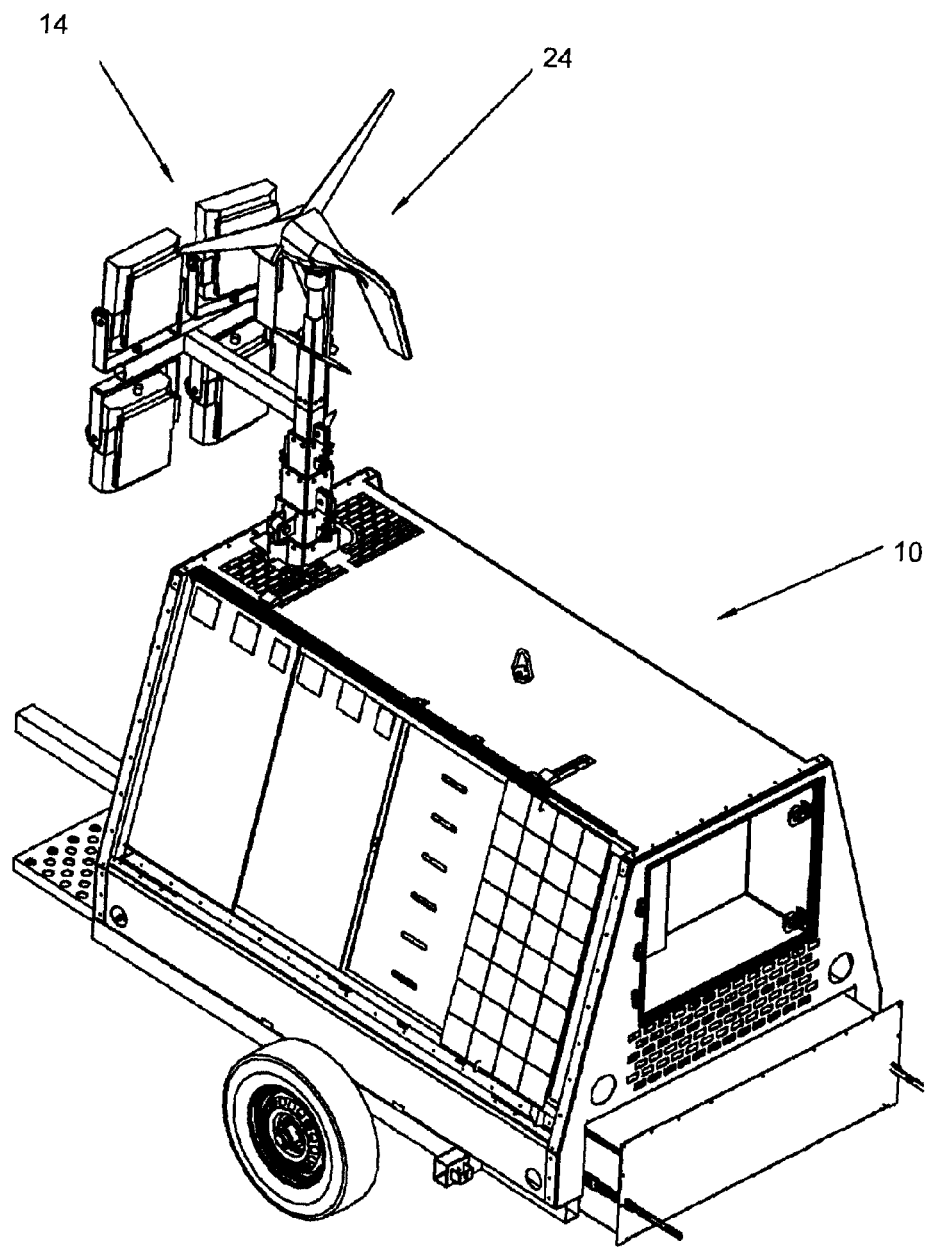
FIG. 5B is a perspective view of a trailer-mounted hybrid light tower showing the light mast in a retracted position in accordance with a wind-powered embodiment of the invention.
Figure 6:
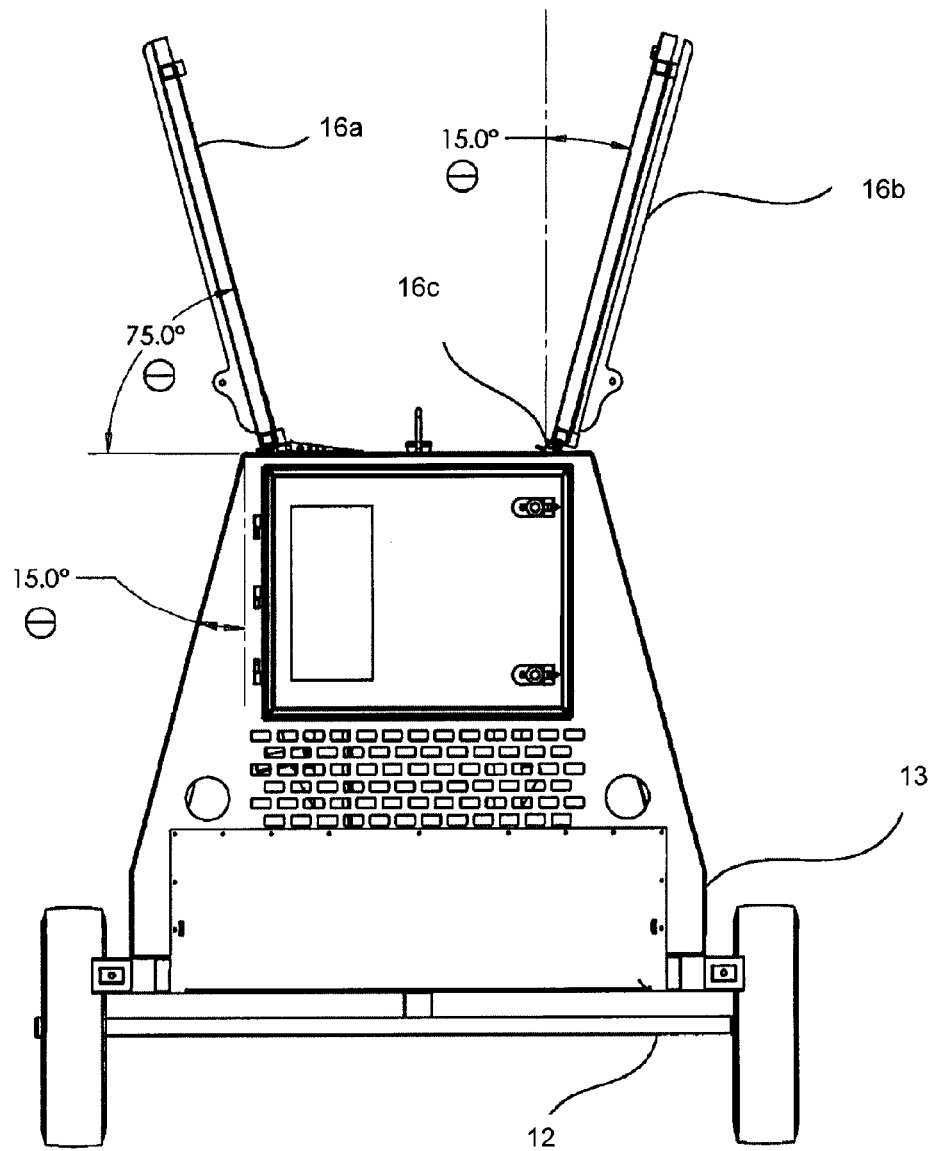
FIG. 6 is an end view of a trailer-mounted hybrid light tower showing each solar panel in a maximum deployed position.

With reference to the figures a portable, skid-mounted, wheeled and/or collapsible hybrid-power-source lighting and energy management system (referred to herein as a hybrid lighting system or HLS) 10 for remote, harsh and/or cold climate operation is described. The system utilizes a battery storage bank and an internal combustion engine (ICE) with a power generator to power a lighting system together with an intelligent control system (ICS) that efficiently manages energy consumption and delivery. In various embodiments the system utilizes solar and/or wind energy in conjunction with ICE energy and may also include a heating and/or auxiliary power systems. Generally, for those embodiments utilizing renewable energy sources, the system operates to prioritize the use of wind and/or solar energy when available but can draw on ICE generated power and/or stored battery power when neither wind nor solar are available in sufficient amounts to power the lighting system and/or auxiliary energy draw. In a condition where renewable components are either not added to the lighting system or if the system is deployed in an environment there the renewable components do not receive inputs from solar and/or wind, the lighting system is still able to reduce ICE runtime, fuel consumption and operator involvement due to the ICS functions and other system components such as LED lighting. Additionally, the system operates to manage the various power inputs in a manner that provides maximum value for each time segment the ICE is used when the system is utilized as a stand-alone lighting system. That is, the system is generally designed and operated in order to minimize fuel consumption and ICE runtime in conjunction with effective management of a battery storage bank. Further still, the system operates with a user interface that reduces the requirements for user monitoring and/or contact with the system.

Overview

With reference to FIGS. 1-11, various embodiments of the hybrid lighting system 10 are described. FIGS. 11-16 show various control schemes showing different embodiments that can be implemented in the operation of the system. The various physical embodiments include a skid-mounted system, a trailer mounted system, as well as systems having an optional solar panel and/or wind turbine. For the purposes of this description, the system is described as including a solar panel system although it is understood that a system may be designed that does not utilize a renewable energy source. As such, the system 10 generally includes a trailer base or skid base 12 supporting a body 13, a lighting system 14, a solar power system 16, an internal combustion engine (ICE) 32, a battery system 30, a heating system 26, a mast 27, and an intelligent control system (ICS) 28, where the ICS may comprise one or more sensing and/or controlling devices working together to manage system energy. As noted, the base 12 may be a mobile trailer base that allows the system to be moved to a desired location behind a vehicle or be a skid type base common in the oil and gas industry that allows the system to be moved with an industrial loader or fork lift onto and off a flat-bed truck.

The light tower is moveable between a collapsed position (see FIGS. 1-3 for example) for storage and transportation and an erected position (FIGS. 4, 4A, 4B and 5 for example), when the system is in use. The design and operation of the light tower and associated systems are described in greater detail below.

Mast 27

The mast 27 is attached to the base 12 for supporting the lighting system 14 and an optional wind turbine 20. In one embodiment, there may be more than one mast for separately supporting the lighting system and wind turbine, however for the purposes of this description, the lights 14 and wind turbine 20 (where included) are supported on a single mast. The mast can be moved between an extended and retracted position via telescoping means for transportation purposes and to adjust the height of the mast. In another embodiment, the mast may also pivot between a vertical and horizontal position for ease of transport and storage for some configurations. The mast may be erected using a series of cables and an appropriate motor system to progressively extend sections of the mast. In one embodiment, connected to the mast is a proximity switch, limit switch or other such switch or sensing device also connected to the system such that certain components of the ICS become deactivated while the mast is in its retracted position, such as the mast position during transport. In the previous example embodiment the automatic deactivation of a PLC and/or ICE autostart occurring from the operator action of mast retraction, prevents the system from self-starting while in transport and/or storage without the need for the operator to perform the additional step of system deactivation. This therefore limits human error from contributing to system mismanagement or harm.

Lighting System 14

Referring to FIG. 1, the lighting system 14 generally includes a light attachment member 14a connected to the mast 27, and one or more light panels 14c mounted to the light attachment member 14a. The angle and orientation of the lights may be automatically and/or manually adjustable. To adjust the angle, the lights may pivot about the light attachment member. The light attachment member may also pivot or swivel around the mast to effect the orientation of the lights. Preferably the lights are LED panel lights. In one embodiment, the intensity of the LED lights can be adjusted automatically and/or manually. The lights will typically operate with 12-96 volts, however in the preferred embodiment the light voltage is 24-48 volts to reduce line losses. The power rating of the total system lights may range from a few hundred watts to several thousand, depending on the need or the offset lighting comparison. By way of comparison, if a typical standard light tower system consumes 4,000 watts, an equivalent LED lighting system may have a 700-1500 watt rating.

The lighting system may also include a photoresistor/photocell 36b (FIG. 13) that can be utilized to sense ambient light levels and automatically power the lights on or off at pre-determined threshold points.

Solar Panel System

In the preferred embodiment the solar panel system 16 includes one or more arrays of solar panels 16a, 16b configured to the body 13 with appropriate mounting systems, hinges, lifting mechanisms and/or scaffolding. As shown in FIG. 1, the system has two arrays of solar panels 16a, 16b, each comprised of a number solar panels mounted on opposite sides of the body. Generally, the photo-active side of each solar panel is facing outwards when the solar panels are retained against the body.

As shown in FIGS. 6 and 7A-7C, the solar panels 16a, 16b can pivot with respect to the body 13 about a horizontal axis via a pivot member 16c between a fully retracted position a), a fully extended position d) and intermediate positions b) and c). In one embodiment, the solar panels may be pivoted and locked at set increments, e.g. every 10 degrees, between positions a) and d) by various support and locking systems as known to those skilled in the art. In one embodiment, the system includes one or more actuators 17 that enable the operator to manually extend and retract the solar panels to any desired angle.

In a preferred embodiment for cold weather climates, opposite sides of the trailer body 13 are at an angle θ with respect to vertical in order to reduce snow accumulation on the trailer body and the solar panels when they are in position a) and to enable orientation to a low sun angle to the horizon in high latitude climates. The optimal snow deflection angle for 0 is approximately 15°, however in other embodiments the angle θ may be from 0 to 45°. FIGS. 6 and 7A-7C illustrate the solar panels as being pivotable approximately 150° between position a) and position d) which represents the desired orientation range for most deployments. In other embodiments, the solar panels may be pivotable more or less than 150° if required or preferred for a particular deployment.

Figure 7A:
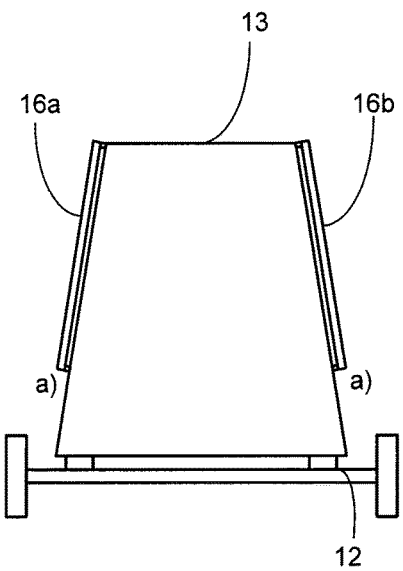
FIGS. 7A, 7B and 7C are schematic views of a trailer-mounted hybrid light tower showing solar panels in a retracted position (7A), low sun angle deployment (7B) and high sun angle deployment (7C).
Figure 7B:
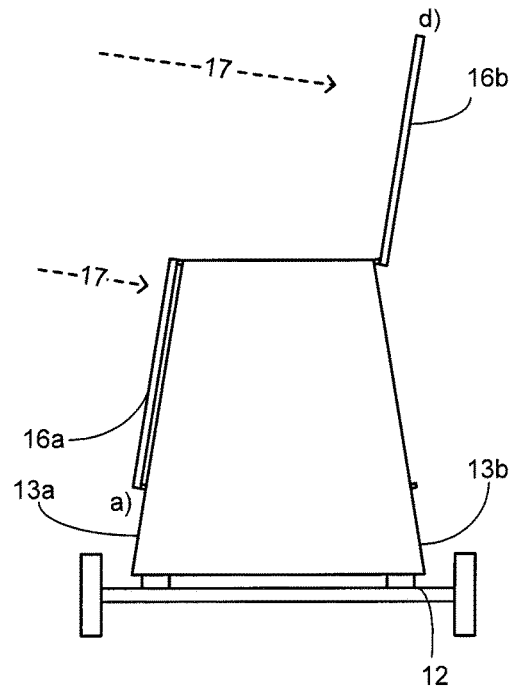
Figure 7C:
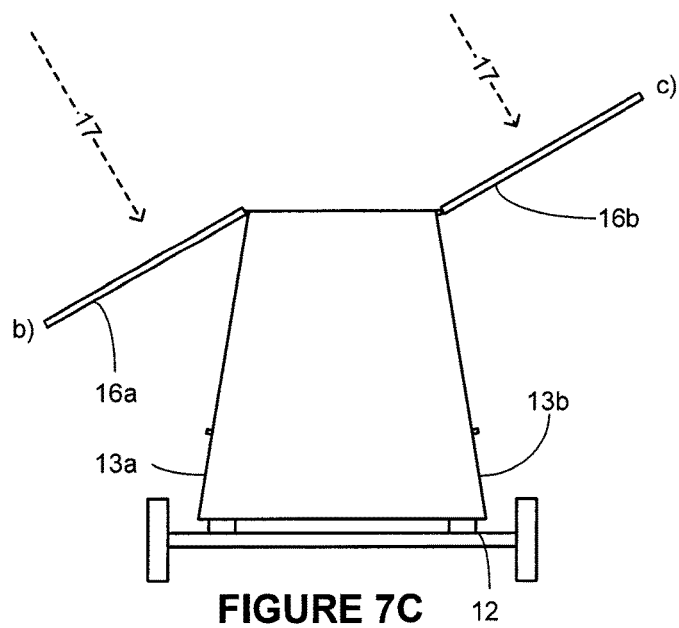

Referring to FIGS. 7A, 7B and 7C, various orientations of the first and second solar panels 16a, 16b are illustrated to demonstrate how solar energy can be most effectively captured based on the angle of the sun relative to the horizon. In high latitude climates, in the winter months, in the northern hemisphere, FIG. 7B may be the desired setup due to the reduced daylight hours in which the sun appears to hug the southern horizon. During these times snow fall would not accumulate on the solar panels due to the angle of the solar array. Further, in this embodiment, the angle of the body 13 preserves the life of the actuators or pistons that position the arrays. During setup, the body 12 will be oriented in an east/west alignment such that one side of the body containing an array of solar panels will be oriented to the south (in the northern hemisphere). Thus, a first side 13a of the body containing solar panels 16a would be facing south. A second side 13b of the body would therefore be facing north.

FIG. 7A shows both solar panels 16a, 16b in a storage and transportation position a). FIG. 7B shows the solar panels 16a, 16b, accordingly, in positions a) and d), used to most effectively capture energy from the sun's rays 17 when the rays are at a low angle to the horizon, such as at high latitudes (generally 50° or above) and/or in the winter season. FIG. 7C illustrates the solar panels 16a, 16b, accordingly, in positions b) and c), used when the sun's rays 17 are at a higher angle to the horizon, such as at mid-latitudes or in the summer season at high latitudes. As such, in one embodiment, the operator will, based on the knowledge of the latitude and time of year, deploy the solar panels such that the solar panels are oriented at an angle as close to 90 degrees to the incident light as possible. In the winter months, when the sun is low to the horizon over the entire day, generally little or no adjustment of the solar panels would be required during the day. During longer days, it may be preferred to set the solar panels for the mid-morning and mid-afternoon sun angle such that the average incident angle during the course of the day is close to 90 degrees.

In another embodiment, the solar panels may be mounted to a solar sensing device such as a solar tracker 36b (FIG. 13) that will automatically orient the panels to the optimum position, throughout the day, week or month that allows the greatest solar input to the system. A solar tracking system may also be integrated with a GPS database as described in greater detail below to dynamically move the panels based on geographical location and time of year.

Various solar panels may be deployed as known to those skilled in the art. For example, the system may include 2 arrays containing 4 to 12 panels with a 100 watt rating each. In other embodiments there may be 1 or more arrays with solar panels rated for 100 to 500 watts each. Solar panel footprint, shape and power rating will consider any or all of the following: a calculation of solar availability, ICE size, load drawn by the LED lights, energy management methods, ICS function and/or acceptable levels of annual fuel consumption, among other factors. Typically, the smaller the solar footprint and greater the LED draw, the more fuel must be consumed.

Wind Turbine

Figure 8:
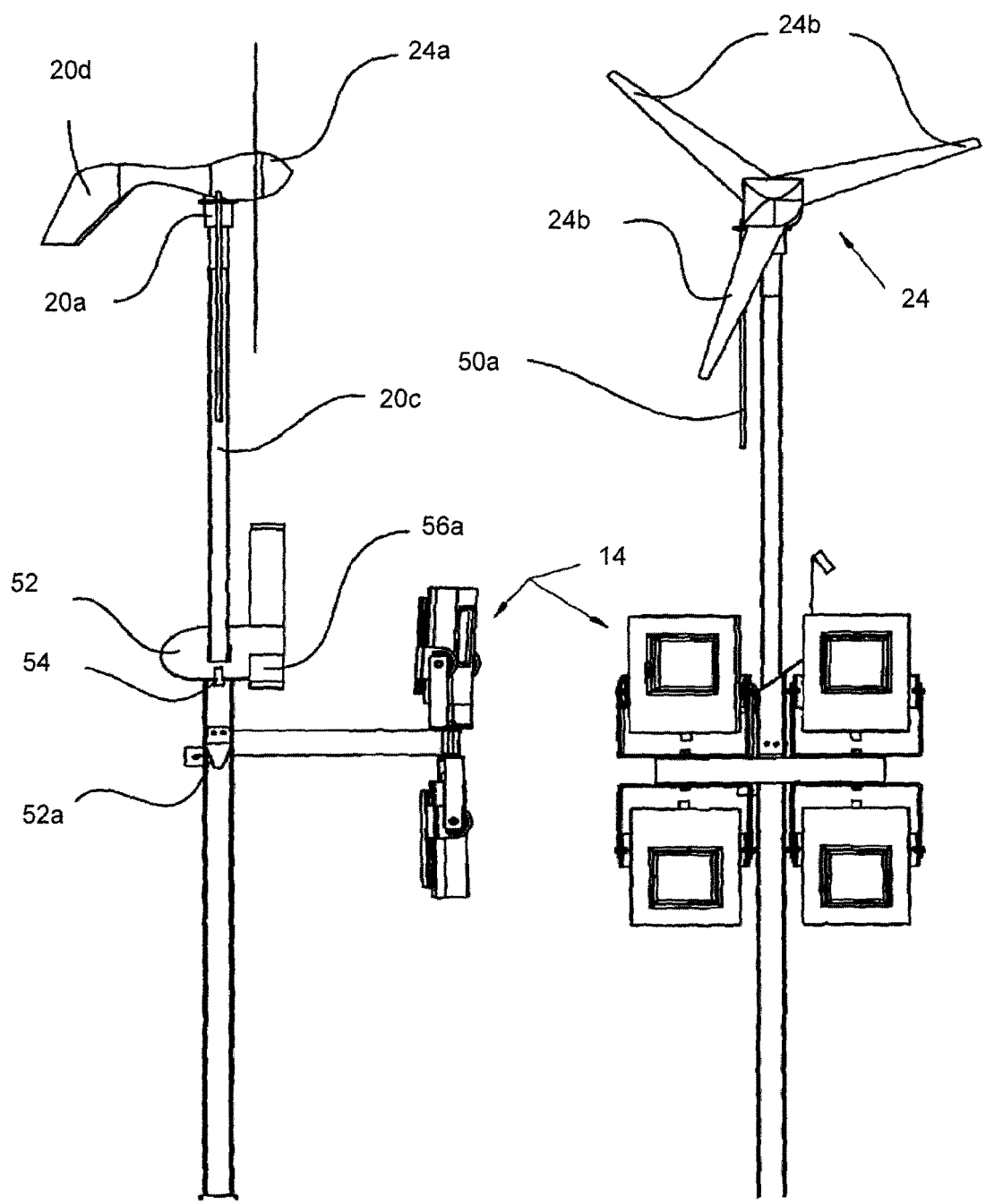
FIG. 8 are side and front views of a light mast in an extended position with a wind turbine.
Figure 9:
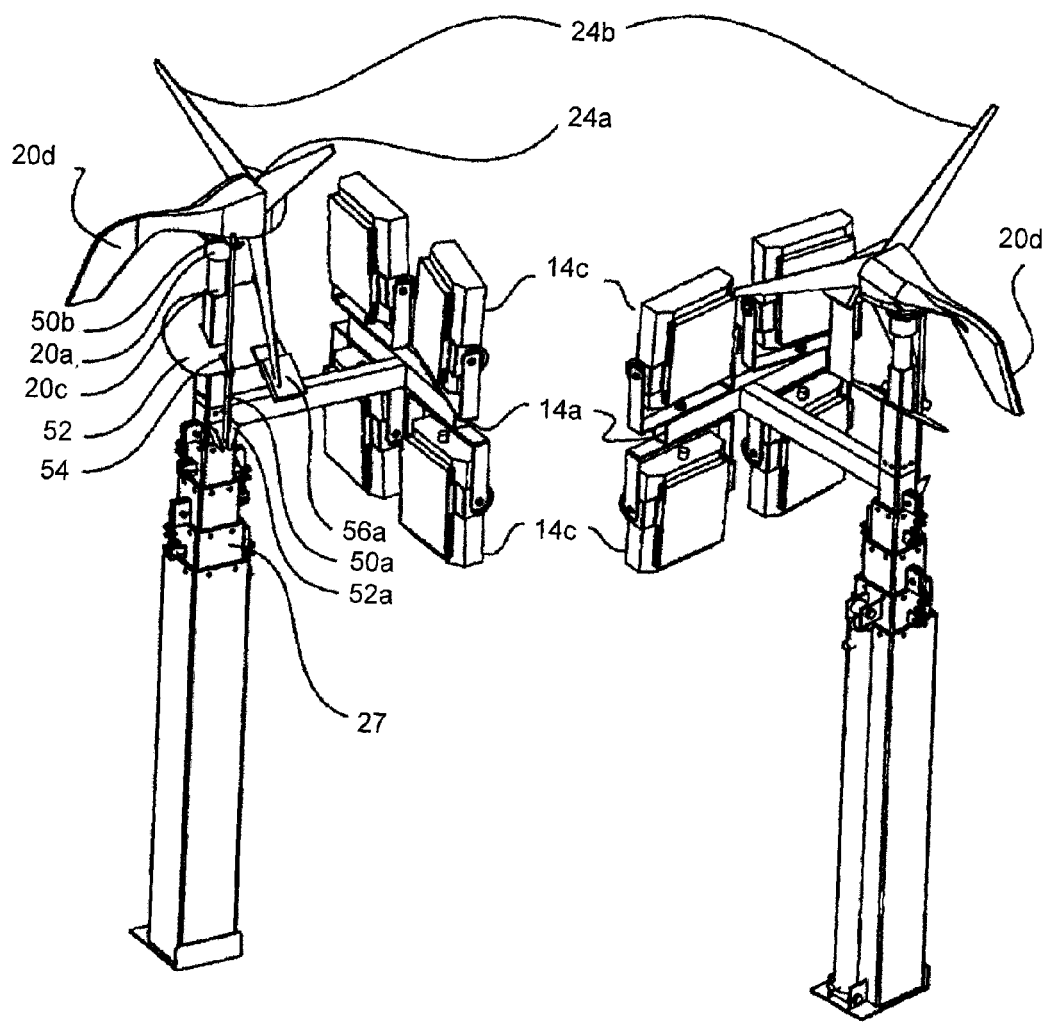
FIG. 9 are rear perspective views of a retracted light mast with a wind turbine.
Figure 10:
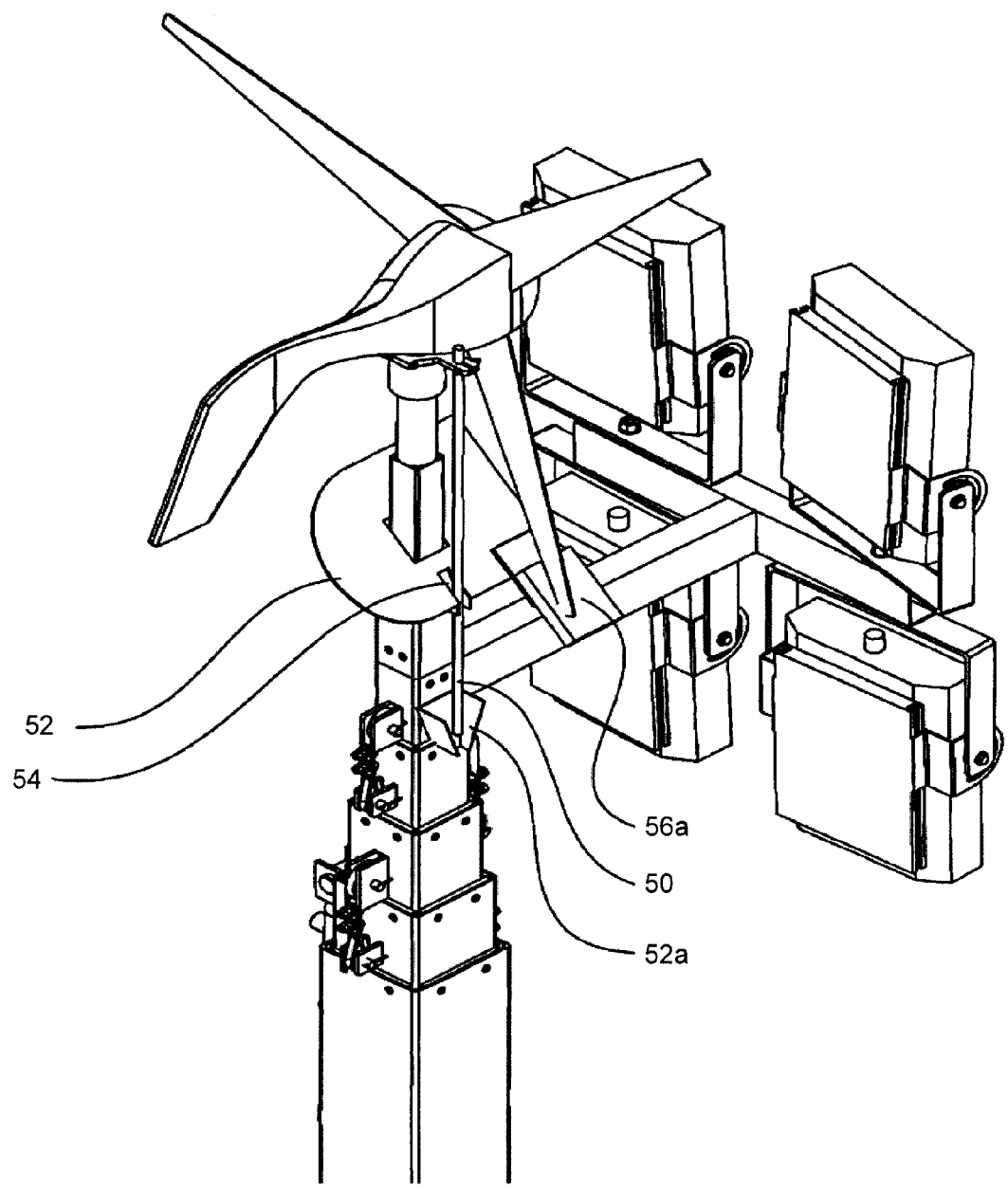
FIG. 10 is a rear perspective view of a hybrid light tower mast in a retracted position with a wind turbine.
Figure 11:
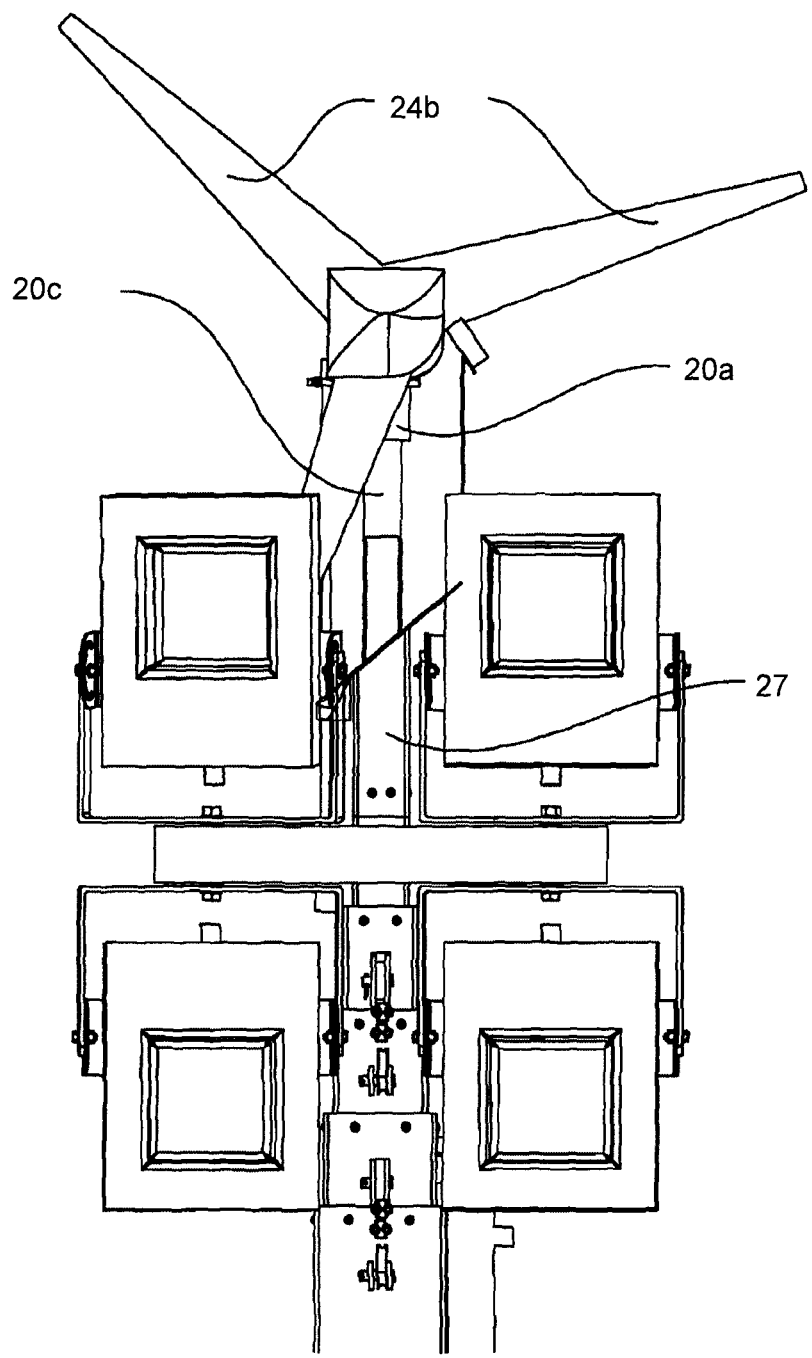
FIG. 11 is a rear view of a hybrid light tower mast in a retracted position with a wind turbine.

In one embodiment, a wind turbine 20 is configured to the body 13 to capture wind power for the light tower system 10 (see FIGS. 4A, 4B, 5A, 5B and FIGS. 8-11. The wind turbine preferably includes a shaft 20c that is telescopically connected to the mast 27 to enable the wind turbine to move between an erected position as shown in FIG. 8 and a retracted position as shown in FIG. 11.

Referring to FIG. 8, the wind turbine 20 comprises a rotor 24 connected to a supporting member 20a, the rotor having a hub 24a and blades 24b that rotate in the wind with respect to the supporting member. The supporting member is connected to the shaft 20c via a yaw bearing or similar device that allows the supporting member and rotor to swivel around the shaft. A wind vane 20d connected to the supporting member causes the rotor to orient itself with respect to the shaft to most effectively capture wind energy based on the current wind direction. The wind turbine includes the necessary components and circuitry to convert wind energy into electricity, including an electrical generator, gearbox, control electronics, etc. (not shown).

The wind turbine includes a number of features for easy and/or automated and/or one-touch deployment and retraction. These features are best shown in FIGS. 8 to 11, as the wind turbine moves from full extension (FIG. 8), to full retraction (FIGS. 9-11).

Referring to FIGS. 8 and 9, the retraction/deployment features include a guide rod 50 and an angled plate 52 having a slot 54 for receiving the guide rod to prevent the wind turbine from swiveling while in the retracted position. A top end 50b attaches to the rotor and the plate 52 is attached to the mast 27. When the shaft 20c is retracted within the mast, a bottom end 50a of the guide rod contacts the angled plate and causes the supporting member 20a and rotor 24 to swivel such that the guide rod enters the slot 54. When the slot receives the guide rod, the supporting member and attached rotor are directed to and locked in a specific orientation, such as a front-facing orientation, preventing the wind turbine from swiveling during storage and transportation. A spacer 52a or other appropriate securing means is fixed to the mast below the slot and plate for receiving, guiding and providing stabilization for the bottom end 50a of the guide rod as it exits the underside of the slot 54.

Referring to FIGS. 10 and 11, the wind turbine also includes at least one bumper 56a for preventing the rotor from rotating when the wind turbine is in the retracted position and for providing protection to the blade. The at least one bumper is preferably fixed to the angled plate such that when the shaft 20c is retracted and the guide rod 50 received in the slot 54, one of the blades 24b contacts the bumper 56a, preventing the blade and rotor from rotating.

The bumpers are preferably made of rubber or another absorbing and cushioning material in order to absorb shock and prevent damage to the blades during retraction of the wind turbine and during storage and travel.

The wind turbine retraction/deployment components, specifically the guide rod 50, plate 52, slot 54, and bumper 56a, allow for automatic and easy retraction and deployment of the wind turbine. In this embodiment, it is not necessary for an operator to manually rotate and secure the swiveling windmill and rotatable blades during retraction of the wind turbine, as this is done automatically by the action of collapsing the telescopic mast 27. Similarly, during deployment of the wind turbine, it is not necessary for an operator to manually release the retraction/deployment components, as this is also done automatically.

Deployment and Retraction of System

As configured, a user will deliver a light tower system 10 to a site and orient the trailer or skid, in an appropriate direction for solar energy capture. Typically, either the first side 13a or the second side 13b of the trailer body will be oriented facing south (when deployed in the northern hemisphere). The solar panels and lights 14c are oriented as desired at the site either before, during or after erection of the mast. The wind turbine 20, if present, is released as the mast 27 being extended.

Figure 16:
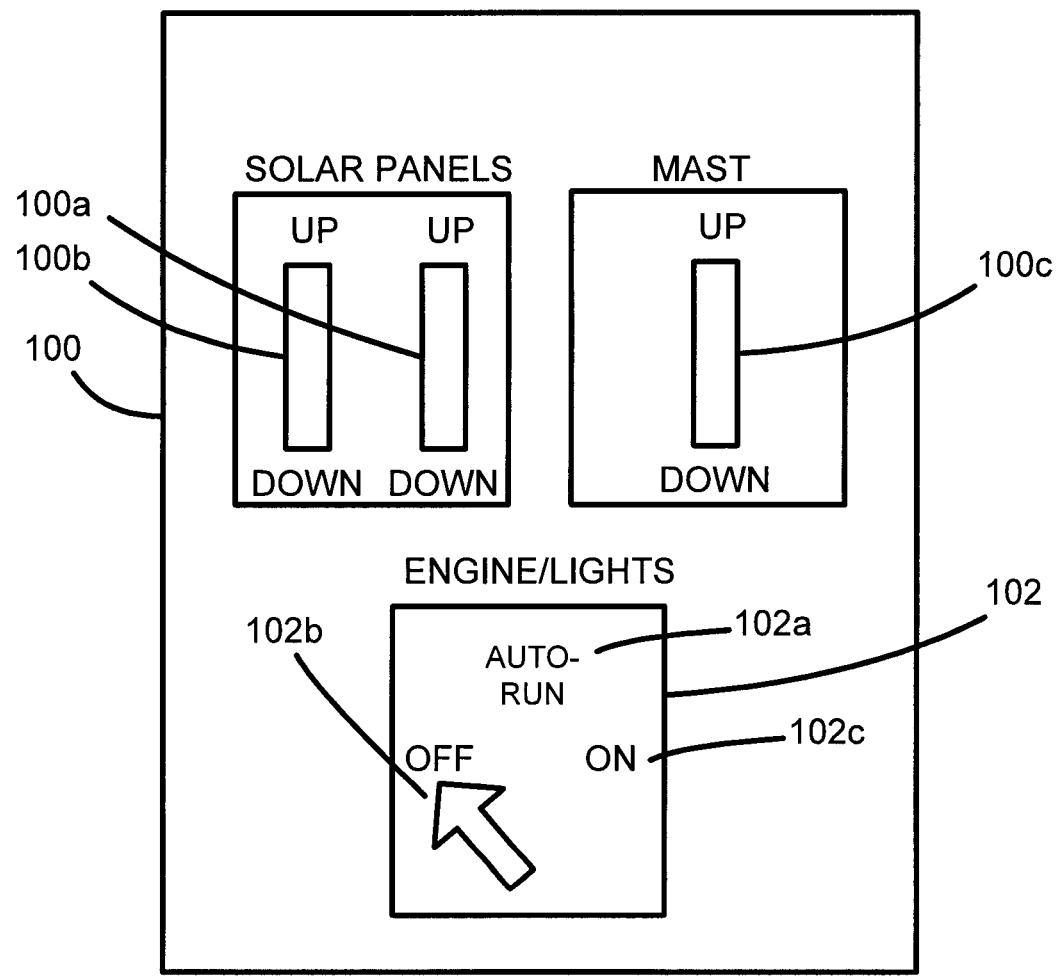
FIG. 16 is a schematic diagram of a control panel in accordance with one embodiment of the invention.

Importantly, in a preferred embodiment as shown in FIG. 16, the system has a control panel 100 for interfacing with the operator and that allows the operator to deploy and activate the system with minimal time and a limited number of physical touches. In one embodiment, the control enables an operator to deploy the system with as few as 3 touches. Advantageously, a 3-touch user control interface system integrated with system components including ICS components, which in one embodiment may include a PLC with pre-set internal logic, minimizes the risk of human error in deploying the system with could cause inefficient operation and/or cause damage to the system. That is, to deploy the solar panels, the control panel includes a first pair of toggle switches 100a and 100b to allow the operator to lift each solar panel to a desired angle (first touch). A second toggle switch 100c causes the extension of the mast (second touch) and a power switch 102 is activated to place the system in an automatic run mode, off mode or manual ICE mode (third touch) explained in greater detail below.

Internal Combustion Engine (ICE)

The ICE 32, including the necessary associated electronics, power generator and fuel tanks, is configured on the trailer body 13, and is preferably contained within a covered frame 18 to provide weather protection to the engine. The ICE provides energy to charge the battery bank through AC to DC battery chargers, power the lighting system and/or generate power for an auxiliary energy draw as needed and as controlled by the ICS 28. Preferably the ICE is a diesel-fuel engine and generator and includes a separate starter battery 33 for starting the ICE. While diesel fuel is a preferred fuel, other fuels may be utilized depending on the ICE.

In various embodiments and particularly for cold climates, the ICE includes a heating system that operates to maintain the temperature of the ICE in an operating range such that the ICE can start reliably when needed in cold temperatures, without having to keep the ICE idling simply to maintain engine warmth.

The heating system can be designed with various functionalities as described below.

In one embodiment, the heating system pre-heats the ICE only when a start command is given by the operator or by the ICS.

In one embodiment, when an ICE start command is desired and/or signaled, the ICS may, depending on the ambient temperature, ICE temperature, climate or time of year, delay sending the start command to the ICE, instead sending a start command to a heating system allowing the ICE to preheat for either a set time period or a predetermined temperature threshold, at which point when either is reached the ICS or the operator would then send an off command to the heating system and a start command to the preheated ICE.

In another embodiment, the ICS may turn the ICE on and off throughout the entire day and/or night as needed to maintain an optimal ICE temp range, particularly in cold climates to ensure the ICE is always on-call should an operator need to run the ICE in manual mode to produce ancillary power. This operation would pulse the engine and/or the battery bank with electric power and/or thermal heat resulting in a reduced need for an ICE heating system such as an ICE coolant heater or block heater.

In one embodiment, a heat exchanger 44 captures and recycles heat generated by the ICE while it is running. In another embodiment the ICE powers electric heat and/or electric cooling devices, such as a fan, to various system components while running.

In one embodiment the ICE schedule is controlled by components of the ICS such as timers that can be manually set by an end user (worker) and control 24 hour period of time. In another embodiment the ICE schedule is controlled a PLC that does not allow for the end user (worker) to adjust the schedule at a worksite. In other various embodiments the ICE schedule is controlled by any combination of timers and PLC. All of the above may be integrated with and ICE autostart.

A consideration when choosing the size of the ICE to be used is maximum load for an operator and/or the size of the AC to DC chargers chosen to charge, pulse and/or float the battery bank. In a typical deployment, the ICE is sized to power a 15-20 kw generator which sufficient to power most ancillary loads. In one embodiment, a heat exchanger 44 captures and recycles heat generated by the ICE while it is running.

Primary Battery Bank (PBB) and ICE Starting Battery (ISB)

The primary battery bank (or battery system) PBB 30 and/or ISB 33 are configured to the body 13 within the enclosure 18 and receive and store energy generated from the solar power system 16, the wind turbine 20 (if present), grid power (if available) and/or the ICE 32. The PBB and/or ISB also release the energy to power the lighting system, and/or various components of the ICS and system. As discussed in greater detail below, the management of battery power in conjunction with the ICS provides numerous operational and functional advantages over past systems.

Importantly, the voltage and current ratings of the PBB are designed in conjunction with the overall energy performance of the system and with a primary objective of improving the efficiency of fuel consumption for a particular operational situation.

The voltage rating of the PBB will typically be designed with a voltage between 12-96V, but preferably between 24 volts and 48 volts, to avoid system power losses due to line loss and to easily integrate with off-the-shelf system components. In one embodiment the PBB is sized to 800-900 amps. In another embodiment the PBB is sized between 400-1600 amps.

The total current rating of the PBB will be chosen in conjunction with the lights, battery chargers and desired method of battery utilization.

The ISB may be a 12 volt lead-acid battery commonly used to start an ICE.

In one embodiment the ISB is used to power the heater 26a, the mast, the solar wings and/or components of the ICS.

Battery Heating System

For cold climate deployments, the system will preferably include at least one battery heating system 30e to improve the efficiency of operation of the system batteries. By maintaining battery temperature within a preferred range, both SOC efficiency and cycle life can be improved. The battery heating system may be any one of or a combination of an electrical heating system such as an electrical element or battery blanket, compartment insulation that insulates the batteries from the exterior allowing the thermal heat from charging to remain in the battery compartment without the need for external heat input and/or a coolant heating system that circulates ICE engine coolant around the batteries. In warmer climates, the system may be configured to include a ventilation system including a fan to assist in ensuring that the battery temperatures do not exceed recommended operating temperatures. Each of the heating systems will use appropriate AC or DC power managed through the ICS.

In a typical system, the PBB and ISB are maintained in an optimal operating temperature range typically in the range of 25-27° C.+/−10° C.

Intelligent Control System (ICS)

Figure 12:
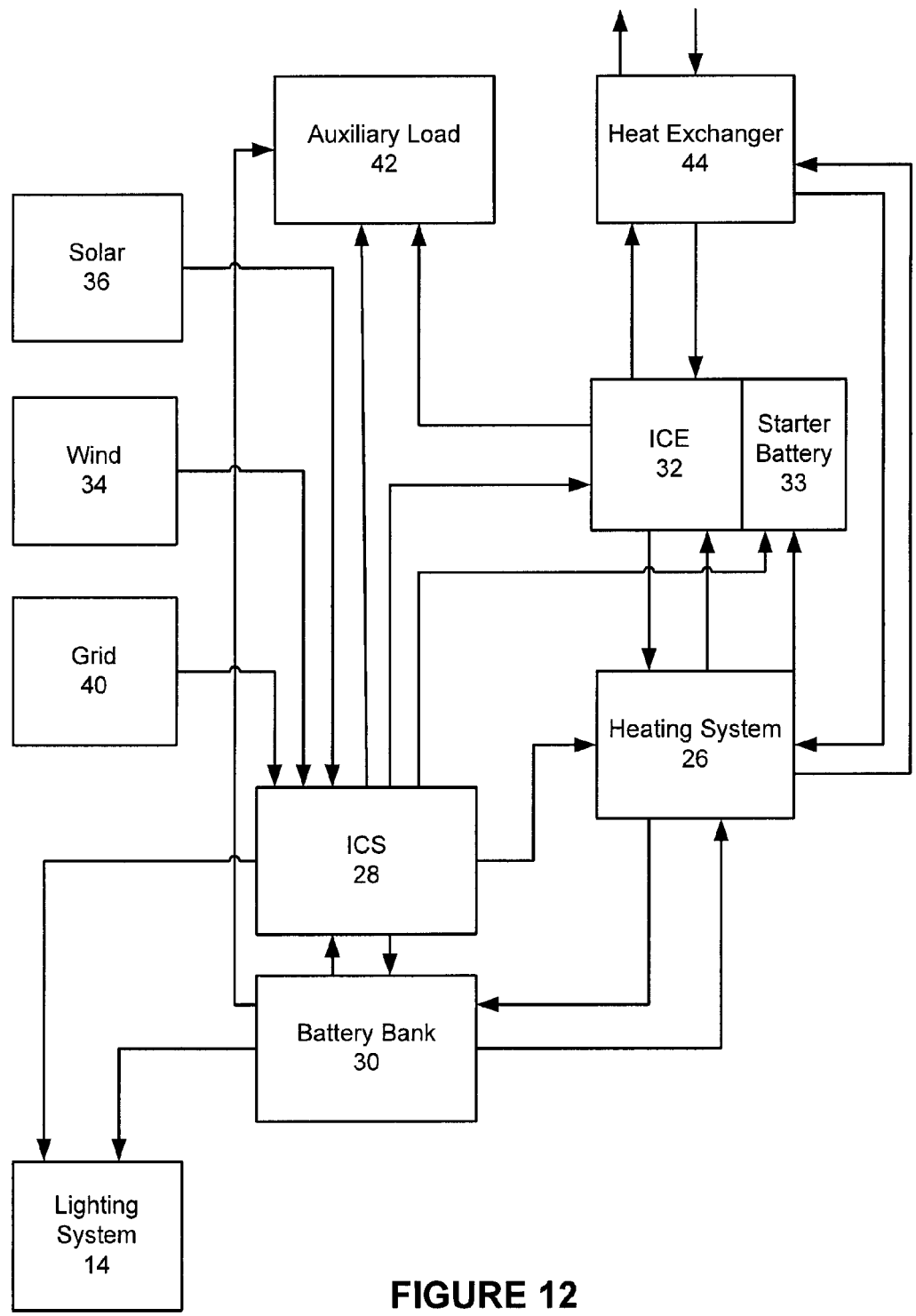
FIG. 12 is a schematic diagram of the various sub-systems of a hybrid light tower having an intelligent control system (ICS) in accordance with one embodiment of the invention.
Figure 13:
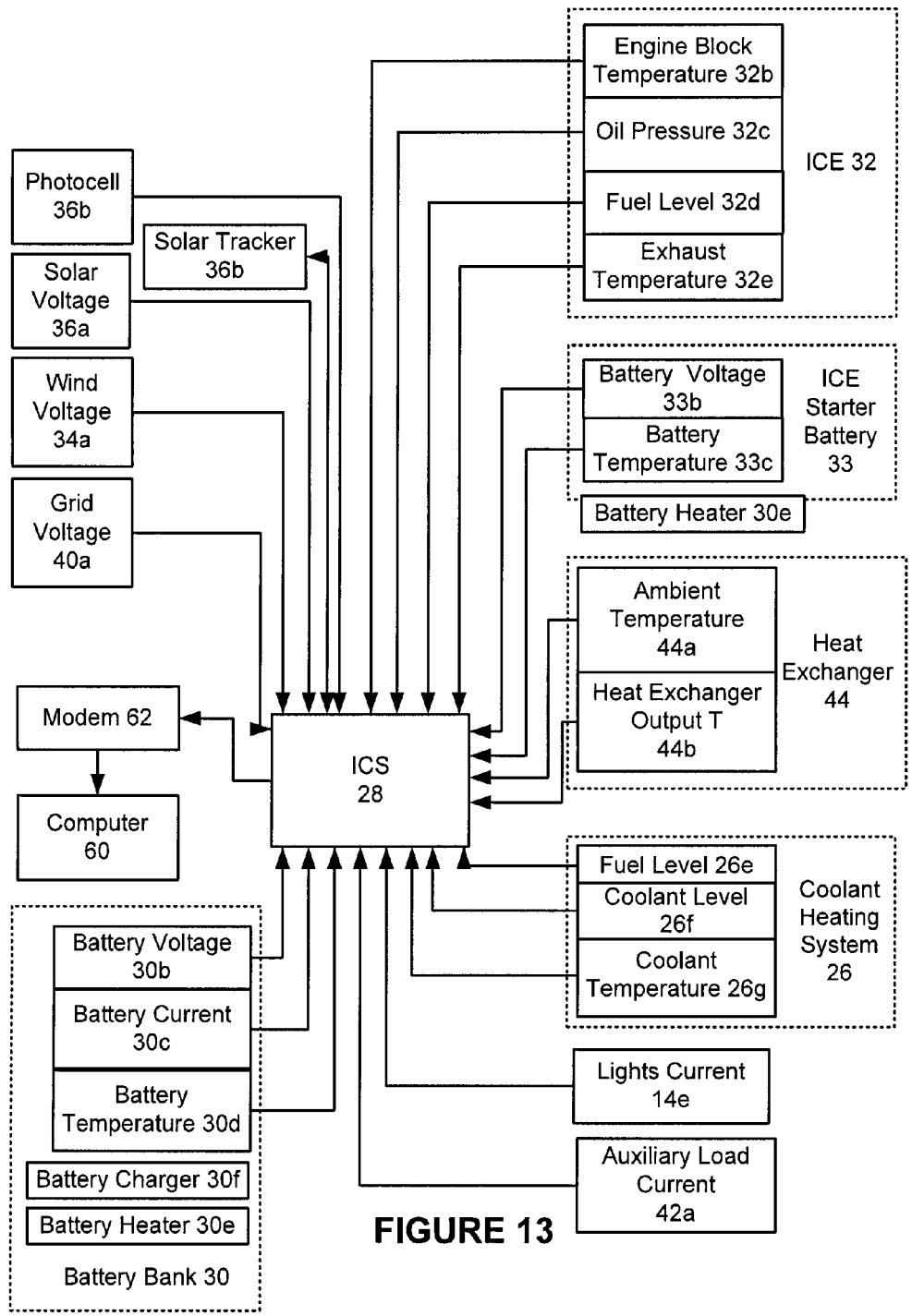
FIG. 13 is a schematic diagram of sensor inputs to an intelligent control system (ICS) that may include any one or all of a PLC, ICE auto-start, GPS, solar controller, voltage sensor, and/or battery chargers in accordance with one embodiment of the invention.

As shown in FIGS. 12 and 13, schematic diagrams of an intelligent control system or controller in relation to other components of the system are described in accordance with one embodiment. The ICS 28 receives power inputs from ICE power 32 and/or grid power 40. Other power inputs can include renewable energy sources including solar 36 and/or wind 34. The ICS controls power input to the lighting system 14 for lighting and to the primary batteries (PBB) 30 as well as power output from the PBB. The ICS may also regulate the heating system 26 to turn it on or off when the ICE and/or PBB reach certain temperature thresholds or based on programmable timing. Importantly, the ICS (or control system) may be either a single component including various processors and sensors or may be an amalgamation of multiple components with various processor and sensors. In FIGS. 12 and 13, for the purposes of illustration, the ICS is described as a single component but it is understood that collectively the ICS can be configured as multiple integrated components, such as a Programmable Logic Controller (PLC) and/or ICE autostart controller and/or time clock (timer) controller, and/or voltage monitor/controller and/or battery chargers with appropriate algorithm based controller and/or solar charge controller, where functional intelligence is distributed between different components.

In addition, and particularly in a harsh or cold-climate deployment, the management of available renewable energy is required to enable efficient operation of the system. In particular, as described above, capturing heat and/or minimizing the loss of heat from the system can have a significant effect on battery SOC and overall battery efficiency. In one embodiment, as shown in FIG. 12, the system includes both the PBB 30 and/or an ICE starter battery 33. As battery efficiencies generally drop as temperatures drop, in this embodiment, the system is configured to circulate heat from a coolant heater and/or ICE to the PBB and/or starter battery to keep it within a preferred operating temperature range for as much time as possible. In another embodiment, the ICE is configured with a heating blanket or elements that heat the PBB when the ICE is running. In another embodiment, an enclosure lined with insulation is sufficient to maintain desired battery temperatures where the thermal energy from charging creates or maintains the enclosure temperature.

Further still, the exhaust system of the ICE may also be provided with a heat exchanger 44 that captures heat from the exhaust system that is channeled or directed to the primary and/or ICE batteries and/or ICE engine block.

As shown in FIG. 13, the ICS 28 may receive inputs from a number of sensor inputs to enable effective energy management within the system. In one embodiment, the ICS will monitor available wind voltage 34a and solar voltage 36a from the renewable power sources and/or available grid voltage 40a. The ICS will generally be looking for power sources based on current load demands and time of day. In one embodiment, if there is a lighting load demand, the ICS will initially look to provide that power by available wind power if available. If wind power is not available, the ICS will look to the PBB while the battery system has available power above a threshold value. If battery power is below a threshold SOC, the ICS will look to the ICE and/or battery chargers 30f for power.

Typically, the ICE will power the battery chargers 30f which in turn charge the PBB and/or ISB while simultaneously providing power to the lights and/or other loads such as heaters, PLC, sensors, etc., as well as any auxiliary AC load, including lights not powered by battery chargers or batteries, such as AC light fixtures. As described in greater detail below, the ICS will generally control operation of the ICE to minimize fuel consumption and optimize battery performance and cycle life. However, it should be noted that the system will generally enable an operator to keep the ICE operating as long as there is a load draw requiring the ICE to operate. In one embodiment, when the load is removed, the ICS will typically run the ICE to ensure the battery bank has a desired SOC charge in which case the ICS will signal the ICE to auto-off. In another embodiment the operator can manually turn the ICE off once the need for ancillary power has been filled.

In one embodiment, battery temperature 30d will preferably be monitored to ensure that the battery temperature is maintained within a preferred operating range. On the ICE, the ICE may be provided with an engine block temperature sensor 32b, ICE oil pressure sensor 32c, fuel level sensor 32d and exhaust temperature sensor 32e. Each of these sensors provides general information about the operation of the ICE for maintenance and performance monitoring.

In addition, the ICE starting battery system, and/or ISB and/or PBB 33 will preferably be provided with a battery voltage sensor 33b, 30b, battery temperature sensor 33c, 30c to provide both maintenance and performance monitoring. The heat exchanger 44 will typically be configured with appropriate sensors 44a, 44b to monitor the ambient temperature of air entering the heat exchanger and exiting the heat exchanger to the ICE compartment. That is, the ICS will monitor the performance of the heat exchanger to ensure that it is providing a net benefit in overall heat management.

The heater system 26, such as a coolant heater system, may be configured with appropriate sensors to monitor fuel level 26e, coolant level 26f and/or coolant temperature 26g. These sensors provide general information about the operation of the coolant heater system and allow for monitoring of its performance.

In one embodiment, if the ICS detects that battery systems and/or ICE temperatures are dropping below threshold levels, the ICS may automatically turn on the coolant heater 26a to run for a period of time to ensure that the system remains at a preferred temperature. In extremely cold weather conditions this auto on/off may occur several times throughout the day and/or night in order to maintain a minimum threshold system temperature. In another embodiment the ICS may turn on the coolant heater 26a to preheat the ICE when the ICE is to be given the "on" command. In this example the ICS would delay the ICE start by an appropriate time during which the coolant heater 26a would preheat the ICE. In another embodiment the coolant heater 26a may be directed by the ICS to preheat the ICE based on timers and/or time coding, rather than temperature.

In another embodiment, if the ICS detects that battery systems and/or ICE temperatures are dropping below threshold levels, the ICS may automatically turn on the ICE throughout the day and/or night for intervals sufficient to maintain a temperature range that ensures the ICE will reliably start. As discussed below in relation to efficient battery charging, periodic charging and discharging cycles improves the overall efficiency of the system.

In one embodiment, the ICS may include a photocell 36b to enable the ICS to automatically turn the lighting system on or off if automatic operation is desired.

In one embodiment, the system will also monitor auxiliary load current 42a and lights current 14e for calculating power usage rates.

In one embodiment the ICS will control the schedule of the lighting system. This may be accomplished by a PLC and/or timers that allow for an end user to manually control the timing of the lighting system and/or the ICE for 24 hour periods. For example the user may enable a timer to turn the lighting system on and off each morning and evening consistent with the local sunrise and sunset times. In one embodiment, a second timer, may be employed allowing the end user to program the timing such that the ICE and lighting system turn on and off daily at the same time or at different times as required by the end user. In another embodiment three timers may be employed allowing the end user to set the timing of a heating system 26a, the lighting system and/or the ICE in a manner suitable to the geographic location and local weather conditions. For example in cold northern climates the system may be designed in such a way that the end user may choose to set timers that permit the heater 26a to turn on 15 minutes before sunset so that at sunset when the light and ICE timers permit them to start, the ICE has already been preheated and the ICE can start reliably without operator involvement. The above are examples and it should be understood that the various timers that make up the ICS can be set in numerous ways that result in desired ICE, lights and heater start and stop times. In a preferred embodiment, for a specific geographic region, a PLC may be employed and programmed based on sunrise and sunset values so that an end user need not manually set timers. This may be advantageous when the lighting system is managed by different users at a given jobsite because it may remove the need for human involvement for light management as the length of day and night change throughout the year. In another embodiment a PLC may be used in combination with one or various timers.

ICS Control of the PBB

As described above, the ICS 28 monitors and controls the various sub-systems as well as the flow of energy through the system. As noted, the primary objectives are: a) to maximize fuel consumption efficiency, b) to manage battery charging to maximize fuel efficiency and optimize battery life, c) to ensure managed delivery of energy to the load and d) to reduce ICE runtime.

Generally with regards to battery life, battery life is improved by managing the charging and discharging of the batteries such that the rates of charging and discharging are maintained within desired ranges. In a typical lead-acid or absorbed glass mat (AGM) battery bank, the efficiency of charging will depend on the SOC of the battery and the algorithm of the battery chargers. That is, for a given available current at a charging voltage, the efficiency of charging when compared to fuel consumption and ICE runtime will vary based on the SOC, the SOC being determined by voltage sampling, amp in/out calculations or other method of determining a battery banks remaining energy or percentage of remaining charge known to those skilled in the art. In addition, depending on the design of the battery, the cycle life the battery will be affected by the charging and discharge rates that the battery is subjected to.

For example, batteries designed for deep-discharge will typically enable a lower current to be drawn from the battery to a lower SOC. If the rate of discharge is maintained within a preferred range and the battery is charged at a preferred rate, an optimal number of charge cycles will be realized. Similarly, high-power batteries designed for delivering high currents may have their life compromised if the battery is repeatedly allowed to discharge below a recommended SOC.

Further still, depending on the SOC, the rate of charging will vary for a given input voltage and current. That is, in a typical AGM battery, the optimal charging current will vary for different SOCs where charging can be characterized as bulk phase charging, b) absorption phase charging and c) float phase charging.

Generally, bulk phase charging provides the most efficient and the most rapid rate of charging (i.e. where the battery is accepting the highest current) and will occur up to a SOC of about 80%. As charging continues in to the absorption stage of charging (eg. about 80-95% SOC), the rate of charging will diminish with the battery accepting a lower amount of current resulting in greater charging time, and longer ICE runtime, for a lower percentage of SOC increase. Rate of charging will diminish further during the float stage for the final 5% (eg. from about 95-100%) where the battery can only accept a still smaller amount of current. As understood by those skilled in the art, the ranges for each of the bulk, absorption and float stages can vary and the above ranges are only illustrative.

In one embodiment, the majority of time spent charging is limited to the bulk phase of the battery charger algorithm which can be effective in minimizing ICE runtime while optimizing battery charging rate. In this embodiment a maintenance cycle to periodically bring the SOC to 100% can increase battery life and other battery performance characteristics.

Importantly, and in accordance with the invention, the ICS balances the above system parameters with the overall operational objective of reducing fuel consumption at a job site. That is, the ICS receives instantaneous data from the system to monitor present system status and determine short-term actions while also undertaking longer term actions to improve long-term operation and health of the system.

As such and in a preferred embodiment, the ICS will manage daily charging of the PBB depending on the time of day and the anticipated or actual load and longer cycle charging to optimize battery cycle life. The charging regimes are generally defined as a daily cycle and maintenance cycle.

The daily cycle, or bulk phase charging cycle, generally charges and discharges the PBB within a range of SOCs in conjunction with the daily load on the system. Typically, during the daily cycle, the ICS will initiate charging of the PBB when the SOC drops below about 50%-60% and shut-off charging of the PBB when the SOC reaches about 75-80%. In a typical scenario, the daily cycle will include a time during which the PBB is discharging due to the load (time period based on actual load) followed by a 1-2 hour charging cycle. The daily cycle may repeat several times over the course of a day or designated period of time within a day dictated by the ICS and/or its coding.

The maintenance cycle generally charges the PBB to full capacity after a longer period of time. The maintenance cycle will typically fully charge the PBB over a 4-8 hour charging cycle and will occur periodically, for example every two weeks of operation or after roughly 20-100 charging cycles. Depending on the PBB, prior to commencement of the maintenance cycle, the SOC may be taken to a lower SOC than during the daily cycle.

Importantly, during the daily cycle, as the electrical conversion rate of consumed fuel is most efficient up to about 80% SOC, excess fuel is not being burned running the ICE. That is, during the daily cycle, a greater percentage of the available ICE power is used to directly charge the PBB meaning that for a given liter of fuel consumed, the system receives the greatest volume of power. Said another way, by only running the ICE when the battery SOC is in a state where the battery chargers can input current in the bulk phase, as opposed to the absorption or float phase, the system receives maximum energy from the conversion of fossil fuel to electrical energy. In contrast, during the maintenance cycle, where the PBB is charged to 100% SOC via all three phases of charging, the conversion rate of a liter of fuel diminishes as the engine may be essentially idling during the absorption and float phase requiring a smaller amount of the available ICE power. Therefore it is advantageous to cycle the batteries between, for example, 55% and 75% SOC during a time period in which the PBB is under draw. In contrast, if one were to charge the PBB to 100% each time the PBB SOC dropped below 55%, the ICE run time would have to be significantly increased resulting in greater consumed fuel. In one embodiment, during daylight hours when the PBB is not under draw from the lights, the ICS will not allow the ICE to run, allowing the solar input to dominate the PBB charging.

Figure 15:
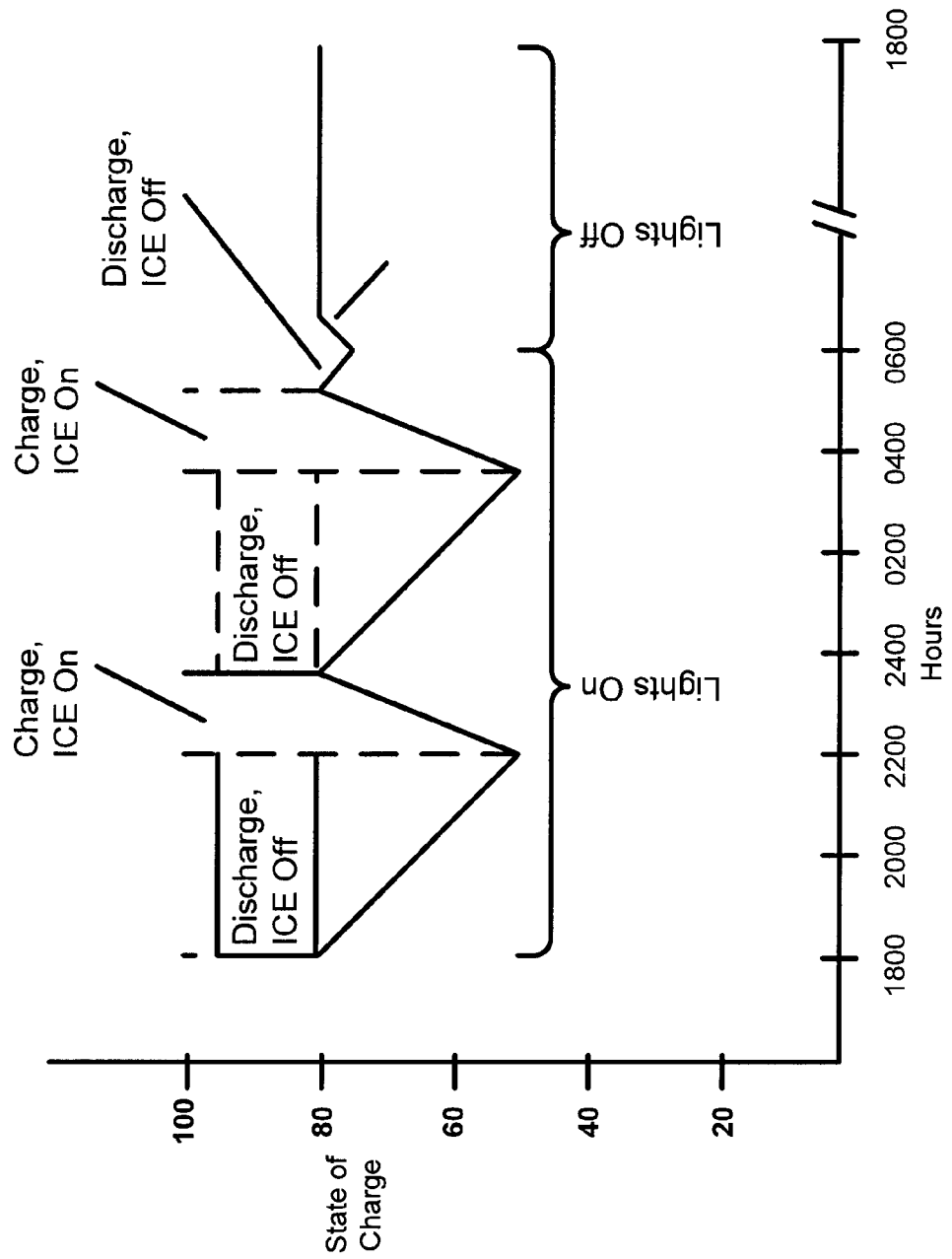
FIG. 15 is a graph showing state-of-charge vs. time of a battery bank in accordance with one embodiment of the invention.

As shown in FIG. 15, a representative daily charging cycle (pulse type charging cycle) of the PBB is shown during a typical 12 hour period of darkness where the ICE may be required. As shown, if darkness begins at 1800 hours and lasts until 0600 hours, in one embodiment it is preferred that the batteries are allowed to discharge to about 50% SOC and then re-charged to about 80% SOC over an approximate 1.5-2 hour charging cycle. Thus, if the batteries are at or about 80% SOC at 1800 h and the lights are turned on, the lights will draw power down from the batteries for a period of time (possibly about 4-5 hours based on load). When the batteries reach about 50% SOC, the ICE will turn on to charge the batteries and simultaneously power the lights. When the batteries reach about 80% SOC, the ICE will turn off and the cycle is repeated until morning when the lights are turned off. Importantly, this pulse type cycling of the battery ensures that the ICE is run for the minimum amount of time during the night to provide sufficient energy for both charging and/or powering the load. For example, in the example shown in FIG. 15, two charging cycles are completed based on a 4 hour discharge (e.g. 1800 to 2200) and 1.5 hour charge cycle (e.g. 2200 to 2330). As a result, fuel consumption is minimized. In one embodiment, the charging intervals may either be controlled manually via a manually set controller(s) such as a timer, in conjunction with an ICE autostart and/or voltage monitor, or in a preferred embodiment, controlled by a PLC via internal time coding combined with an ICE autostart with voltage monitoring functionality. The latter embodiment may be preferred because in one example if a battery charger were to fail, the system would auto correct and simply consume additional fuel as a result of increased ICE run time related to reduced electrical input which can be monitored to detect ICE runtime outside of a baseline. Once detected, the operator has time to repair the unit without risk of operational downtime.

As noted, a maintenance cycle is run on a regular basis where the ICE is run sufficiently long (typically 4-8 hours for a lead-acid or AGM battery system) to fully charge the PBB to 100% SOC.

In other embodiments, different maintenance cycle charge times are programmed into the ICS depending on the month of the year. For example, in high latitude climates where solar in plentiful in the summer and scarce in the winter, the ICS, may allow a 3 hour maintenance cycle in the summer and a 7 hour maintenance cycle in winter. Alternatively, it may be advantageous to allow the chargers to charge until a threshold voltage is achieved equating to a 100% SOC at which point the ICS will send a stop command to the ICE.

In other embodiments, the maintenance cycle, charger run timing and/or voltage parameters all consistent with a pulse type charging technique may be manually controlled and/or controlled by automated coding that suits a specific need.

Other charging regimes may be implemented based on the particular performance characteristics of a PBB and/or chargers. For example, some battery systems may enable efficient bulk charging over a greater range of SOC (eg. 30-80% SOC). Similarly, a maintenance cycle may include discharging the battery to a lower SOC (e.g. 0-10%) prior to fully charging. In another embodiment, if fewer battery charging cycles in a given timeframe are desired, the PBB may be charged by a method wherein the PBB is permitted to charge and discharge between a low threshold, for example 20% SOC, and an upper threshold of between 80%-100% SOC. In this embodiment there may only be 1 charge per day and the maintenance cycle may not be necessary. In this embodiment the ICE may be permitted to turn on with the lighting system at night and run for a programmable period of time or until an upper SOC threshold desired by the operator has been met.

Coolant Heating System (CHS) and Heating System

Figure 14:
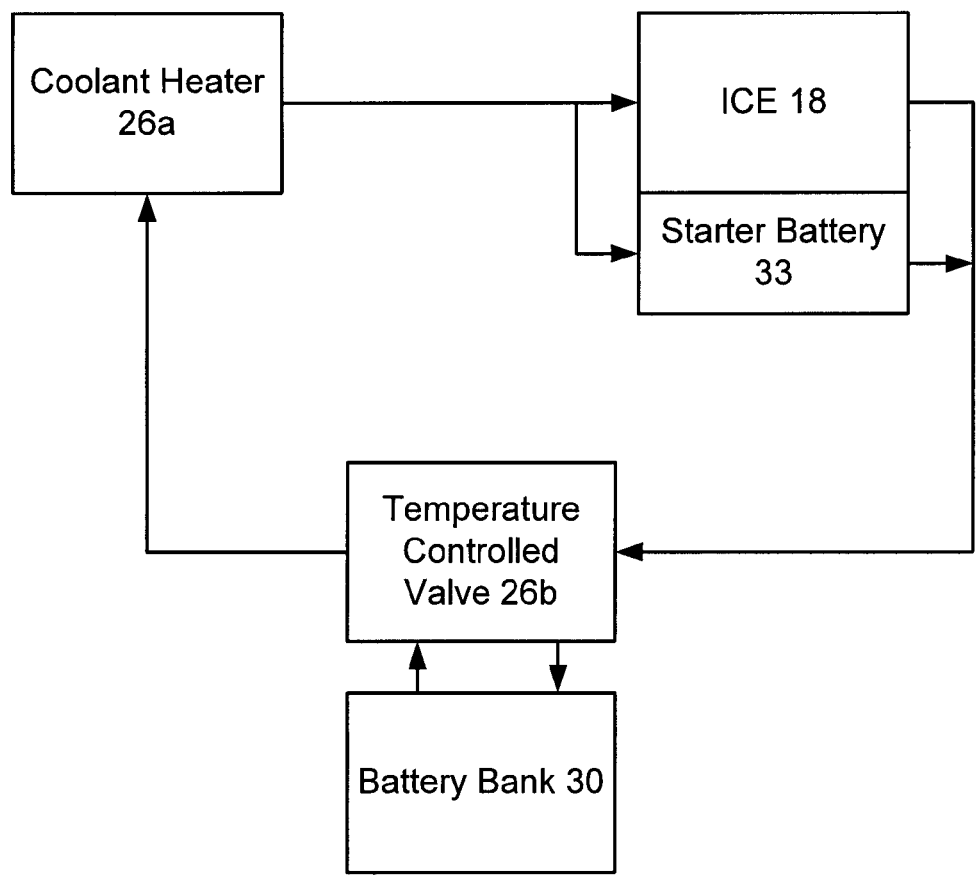
FIG. 14 is a schematic diagram of a heating system in accordance with one embodiment of the invention.

In one embodiment for cold climates, and referring to FIG. 14, the system includes a coolant heating system (CHS) 26 that includes a coolant heater 26a for maintaining a starting temperature of the ICE 32. The CHS creates and circulates warmed coolant through the ICE block, particularly when the ICE is not running and is not generating any heat of its own, thereby maintaining a preferred engine starting temperature within the ICE and enable the ICE to start when in cold ambient temperatures. This allows the ICE to be turned off when it is not needed to generate power instead of being kept idling, thereby reducing fuel consumption in colder climates and the noise associated with running the ICE more than is otherwise needed when compared to a warmer climate. The CHS generally operates by burning a small amount of fuel, relative to the fuel consumption of an idling ICE, sufficient to heat coolant. This preheating process prevents excessive idling of the ICE in cold weather simply to keep the ICE on-call.

In one embodiment, the CHS 26a may also circulate warmed coolant to the battery bank 30 when needed. In this embodiment, a 4-way valve 26b controls the flow of coolant between the coolant heater and battery bank, thereby maintaining the temperature of the battery bank within an optimal operating range. In one embodiment, the 4-way valve includes a temperature-controlled switch that closes or opens the valve based on a pre-determined minimum temperature threshold for the battery bank, such as 10-40° C.

Other Intelligent Control System Features

The ICS may have a variety of features providing particular functionality that may be applicable or beneficial for particular deployments.

In one embodiment, the ICS regulates the CHS to turn it off when the temperature of the circulating coolant and/or the ICE block is higher than a pre-determined temperature range or on when the temperature of the circulating coolant is lower than a predetermined temperature range, such as −5° C. to +5° C. In this embodiment the ICS may rely on a temperature switch to indicate the state of ICE block and/or ICE coolant temperature.

In one embodiment, the ICS is configured to only engage the CHS prior to sending a start command to the ICE.

In one embodiment, when an ICE start command is desired and/or signaled, the ICS may, depending on the ambient temperature, ICE temperature, climate or time of year, delay sending the start command to the ICE, instead sending a start command to the heating system allowing the ICE to preheat for either a set time period or a predetermined temperature threshold, at which point when reached the ICS or the operator would then send an off command to the heating system and a start command to the preheated ICE.

In one embodiment, the CHS is controlled by a temperature switch. In this embodiment the ICE is constantly maintained within a predetermined temperature range so that the ICE is always "on call" for an ICE start command, regardless of the ambient temperature.

In one embodiment, the operator may manually start the CHS prior to starting the ICS. In another embodiment the operator may control a programmable time clock or timer that controls the starting and stopping of the CHS.

In various embodiments, the CHS may be a Webasto™ or Espar™ brand, sized according to the ICE.

AC to DC PBB Chargers

As discussed above, in order to optimize fuel consumption, it important that the entire system manages and derives the greatest amount of useable energy when the engine is run.

In this regard, AC to DC battery chargers are chosen with consideration to the ICE size, power consumption of the lighting system and PBB size. As noted above, the ICS controls when and how the battery chargers provide energy to the PBB and will generally utilize a 2-stage or 3-stage, charging method or algorithm.

During bulk stage charging, the chargers will input current to the batteries close to their maximum input rating which in one example is 40 amps per charger. During the other two stages (i.e. the absorption and float stages), the chargers input fewer amps into the battery per hour of ICE runtime, which in this example may be 8 amps for absorption charging and 4 amps for float charging.

Another aspect of reducing ICE runtime with battery chargers is to size the battery charger to the battery bank and the power needs of the lighting system in such a way as to limit how long the engine is on. By way of example, in one embodiment, the current draw on the lights may be 40 amps, and the PBB holds an 800 amp-hour charge. In this embodiment, the system utilizes 4×40 amp battery chargers. As the lights draw current from the PBB, the SOC reduces until the ICS senses the SOC reaches a minimum threshold, in this case it may be 50% SOC. At this point the ICS starts the ICE and all 4 chargers begin sending a total of 160 amps of which 40 are absorbed by the lights and the balance of 120 amps are used for charging the PBB. The SOC is determined by voltage sampling, amp in/out calculations or other method of determining a battery banks remaining energy or percentage of remaining charge known to those skilled in the art.

Furthermore by managing the battery chargers in the above described manner, it allows scalability of lighting on a given system. For example if a user were to need more light, the system could supply the additional amp draw to the new lights resulting in an increase in engine run time automatically. Whereas if the ICS was designed with components that allowed the engine run time to be manually set by a user, the user would have to understand how to calculate the new engine runtime and/or solar inputs and/or battery charger algorithms along with other system factors to ensure the batteries would not become drained for lack of ICE runtime and/or insufficient battery charging. However, in another embodiment where scalability, flexibility or reduced manpower is less of a concern, the ICS may be designed with controllers that utilize dials, switches, buttons, gears, timers, digital timers or other digital controllers all of which would allow the operator to manually code the system functions based on a known draw and other known characteristics. In another embodiment, the ICE run schedule can be a combination of manual coding and automatic SOC sensing.

Geographical Functionality

In one embodiment, the lights turn on/off based on ICS coding of sunrise/sunset values for different geographic areas. This saves the operator from having to manually set the light schedule as the length of day and hours of sunrise/sunset fluctuate throughout the year. In one embodiment, the system includes a master global sunrise/sunset algorithm coded in the ICS. In one embodiment, the operator may use manual toggle switches dials, gears or the like to let the ICS know which light on/off schedule to use. In another embodiment the ICS receives feedback from an onboard GPS which then controls the light on/off schedule according to the need of that geographic area. The auto-start function for the ICE and the coded light on/off schedule controlled by the ICS is used to reduce operator involvement in managing the system.

Auxiliary Power

If auxiliary power requirements exist at any time, in one embodiment the ICE would automatically be turned on by the ICS to provide the auxiliary power that may be required through the battery bank circuit and/or to an AC and/or DC power outlet on the system. In another embodiment an operator can manually control the ICE by switching the ICS from auto mode to a manual mode to provide the auxiliary power.

Preferably, the system will operate to minimize the amount of time the ICE may be run during nighttime hours so as to reduce the noise impact at the site where there may be workers may be sleeping nearby.

Importantly, the system by using a plurality of energy inputs, and prioritizing based on renewables, can operate more efficiently with less servicing requirements in terms of both fuel and personnel time.

Network Integration

In one embodiment, the system will also include a modem 62 or GPS (not shown) for enabling data being collected from a system 10 to be sent to a central monitoring computer 60. The central computer may allow multiple systems 10 to be networked together at a single job site thus enabling personnel to monitor the performance of multiple units a job site. Centralized monitoring can be used for efficiently monitoring fuel consumption rates for a number of units that may be used for re-fueling planning and fuel delivery scheduling purposes. Similarly, ICE engine, coolant heater, wind tower, solar cell and/or light tower performance can be monitored for performance and maintenance reasons.

Data collected by a job site computer 60, modem 62 and/or GPS may also be reported back to a central system over the internet and/or cell towers and/or satellites for the purposes of monitoring a fleet of equipment across a wide area network. In this regard, each system may also be provided with GPS systems to monitor the location of equipment and transmit data.

Other Design Considerations

It should be noted that in some sun-rich climates, with a large solar panel footprint, it is possible for the lighting to be self-sufficient year round with no fuel consumption; however this typically only occurs when power consumption related to LED lighting is reduced to a value that may not provide comparable light output of a standard MH light tower. With a reasonable sized solar footprint for a portable light tower, if LED wattage is sized to provide comparable light to a standard MH light tower, there must be an ancillary power source (i.e. ICE) to supplement the annual need. Further, when choosing LED wattage, the amount of light provided by the LED must be balanced by acceptable levels of reduced fuel savings. For example, it may be more appropriate to choose less lighting to save more fuel and ICE run time, whereas in another case it may be that more lights are needed that will result in less fuel saving than in another case, but still more fuel savings than using MH bulbs on a standard light tower.

It is also preferable to utilize a system that can provide fuel savings without sacrificing lighting needs. For example, if similar light to a 4,000 watts MH light tower is provided by 1,000 watts of LEDs with approximately 75% reduction in power draw when combined with a typical solar and/or wind power input for a geographical location, this can result in a reduction in fuel consumption, maintenance cost and system wear of 60-95%.

User Interface

In one embodiment, a user interface 100 is provided that simplifies the deployment and operation of the system. As shown in FIG. 16, after orienting the system at a job site, the operator can fully deploy and operate the system with a minimal number of physical touches to the system. In one embodiment, the entire system can be operated by a system of three switches called the 3-Touch Setup Interface (3TSI). As shown in FIG. 16 the interface includes solar panel switches 100a,b, mast switch 100c and ICE/lighting control switch 102. Solar panels can be deployed and adjusted by simple toggle switches 100a,b or in another embodiment the solar panels can be controlled by 1 toggle switch or in another embodiment by several switches allowing for various axis tilting to align the solar panels with the sun. The mast is erected by a similar toggle switch 100c. The ICE/lights can be in one of three modes of operation, "off", "auto-run" where the ICS fully controls the operation of the system, lights and ICE and "manual on" where the operator can manually turn on the ICE while the lights can remain in their automated mode controlled by the ICS. In another embodiment utilizing a 3-touch setup interface, the switch controlling the lights and ICE may have more than 3 positions allowing the operator variations on how to manage the way in which the lights, ICE and other system functions integrate, for example 4 or more positions. In another embodiment, a 4-Touch Setup Interface (4TSI) may be preferable in which case there is a separate switch to control the ICE functions and separate switch to control the lighting functions, both of which have switch positions for off, on and auto-on, the later allowing the ICS to manage the function of the ICE and/or the lights. In other embodiments the control for the lighting may turn on all lights at once or each light individually. In another embodiment the ICE function can be controlled by an ICE autostart controller allowing for off, on or manual run.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A portable hybrid lighting system comprising:
a control system having at least one controller;
at least one light system operatively supported by a mast and operatively connected to the control system;
an internal combustion engine (ICE) having a power generator, the ICE operatively connected to the control system and the ICE power generator for generating electrical power;
a battery storage system operatively connected to the control system, the battery storage system for storing electrical power from the ICE and providing battery power wherein the control system has means for:
monitoring a current state-of-charge (SOC) within the battery storage system;
turning on the ICE to generate electrical power when the current SOC is below a lower SOC threshold or based on an operator programmed start time;
turning off the ICE when battery power is above an upper SOC threshold or when an operator programmed runtime has been achieved;
directing ICE power to charge the battery system between the lower and upper SOC thresholds or operator programmed runtimes; and
directing ICE or battery power to the light system, wherein the control system is configured to control charging of the battery storage system by the ICE by applying a battery charging algorithm in which the upper and lower SOC thresholds are within a bulk stage of the battery system such that the battery charging algorithm only charges the battery system within the bulk stage of the battery system.

2. The hybrid lighting system as in claim 1, wherein the control system initiates a maintenance charging cycle after a predetermined number of bulk charging cycles or a specific maintenance time and wherein the maintenance cycle charges the battery system to 100% SOC.

3. The hybrid lighting system as in claim 2, wherein the control system monitors the number of bulk charging cycles and the maintenance charging cycle is initiated after a predetermined number of bulk charging cycles.

4. The hybrid lighting system as in claim 3, wherein the predetermined number is 10-100 bulk charging cycles.

5. The hybrid lighting system as in claim 2, wherein the control system initiates a maintenance charging cycle after a predetermined time period.

6. The hybrid lighting system as in claim 2, wherein the control system enables the battery system to be charged in a range between a lower threshold SOC and 100% SOC.

7. The hybrid lighting system as in claim 1, further comprising a renewable energy source operatively connected to the control system.

8. The hybrid lighting system as in claim 7, wherein the at least one renewable energy source is any one of or a combination of solar power and wind power.

9. The hybrid lighting system as in claim 1, wherein the at least one light system is a light emitting diode (LED) light system.

10. The hybrid lighting system as in claim 1, further comprising a heating system operatively connected to the ICE and/or control system for heating the ICE when the ICE is off.

11. The hybrid lighting system as in claim 1, further comprising a battery heating system operatively connected to the battery storage system for heating the battery storage system to maintain the battery storage system within a temperature range.

12. The hybrid lighting system of claim 11, wherein the heating system is a coolant heater for circulating heated coolant to the ICE and/or the battery storage system.

13. The hybrid lighting system as in claim 12, wherein the control system includes means for monitoring the temperature of the ICE and/or the battery system and turning on and off the heating system when one or more threshold temperatures are reached or based on timer controlled schedule.

14. The hybrid lighting system of claim 12, wherein the heating system further comprises a valve between the coolant heater and the battery storage system for controlling the flow of heated coolant between the coolant heater and the battery storage system.

15. The hybrid lighting system of claim 14, wherein the valve is temperature-controlled.

16. The hybrid lighting system as in claim 1, further comprising a mast supporting a wind turbine having a telescoping shaft retractable within the mast.

17. The hybrid lighting system of claim 16, wherein the wind turbine further comprises:
a rotor having at least one blade, the rotor rotatably and swivelably connected to the telescoping shaft;
a rod attached to the rotor; and
an angled plate attached to the mast and having a slot for receiving the rod and preventing the rotor from swiveling when the telescoping shaft is retracted, wherein the angled plate is designed to direct the rod into the slot by causing the rod and rotor to swivel.

18. The hybrid lighting system of claim 17, wherein the angled plate further includes at least one bumper extension oriented to contact the at least one blade as the telescoping shaft is retracted to prevent the at least one blade and rotor from rotating.

19. The hybrid lighting system of claim 17, wherein the rotor comprises at least two blades, and the angled plate comprises at least one bumper extension for contact with one of the least two blades when the wind turbine is retracted.

20. The hybrid lighting system of claim 1, further comprising a base for supporting at least one array of solar panels, wherein the solar panels are pivotable about a horizontal axis on the base.

21. The hybrid lighting system of claim 20, further comprising two arrays of solar panels on opposite sides of the base.

22. The hybrid lighting system of claim 20, wherein each array of solar panels are pivotable up to 180°.

23. The hybrid lighting system of claim 20, wherein the base has at least one angled wall and the at least one array of solar panels is pivotably connected to the angled wall.

24. The hybrid lighting system of claim 1, further comprising a photocell connected to the at least one light for sensing ambient light levels and turning the at least one light off or on based on the ambient light level.

25. The hybrid lighting system of claim 1, further comprising a heat exchanger connected to the ICE for capturing and recycling heat released from the ICE for warming the ICE.

26. The hybrid lighting system of claim 1, further comprising an auxiliary load connection for connecting to and providing power to an auxiliary load.

27. The hybrid lighting system of claim 1, further comprising a grid power connector for connecting the hybrid lighting system to a power grid for receiving and delivering grid power to the light system and/or an auxiliary load.

28. The hybrid lighting system of claim 1, further comprising a network connection system for connecting the controller to a remote computer.

29. The hybrid lighting system of claim 1, further comprising a user interface operatively connected to the control system, the user interface having a mast switch for raising and lowering the mast wherein when in the mast is in a lower position, any one or all of the ICE, lights or any component(s) of the control system is deactivated.

30. The hybrid lighting system of claim 29, wherein the user interface further comprises an engine activation switch operatively connected to the control system, the engine activation switch having an auto-run position for activating the control system to activate the ICE based on pre-determined operational parameters.

31. The hybrid lighting system of claim 1, wherein the system includes at least one panel of solar panels and the system further comprises a user interface operatively connected to the control system, the user interface having:
a mast switch for raising and lowering the mast;
at least one solar panel switch for raising and lowering each of the one or more solar panels;
an ICE activation switch operatively connected to the control system, the ICE activation switch having an auto-run position for activating the control system to activate the ICE based on predetermined operational parameters and an ICE manual-run position allowing an operator to manually run the ICE as needed; and
a light activation switch operatively connected to the control system, the light activation switch having a position for activating the lights based on predetermined operational parameters.

32. The hybrid lighting system as in claim 1, wherein the system includes at least panel of solar panels and the system further comprises a user interface operatively connected to the control system, the user interface having:
a mast switch for raising and lowering the mast;
at least one solar panel switch for raising and lowering each of the one or more solar panels; and
an activation switch operatively connected to the control system, the activation switch having an auto-run position for activating the control system to activate the ICE based on pre-determined operational parameters and activate the lights based on predetermined operational parameters and having manual-run position that starts the ICE which remains on while activating the lights based on the same predetermined operational parameters as in the auto-run position.

33. A method for controlling the energy input and output of a hybrid light tower having at least one light, an internal combustion engine (ICE), at least one renewable energy source, at least one controller, and at least one battery storage system, comprising the steps of:

monitoring available power from the at least one renewable energy source and at least one battery storage system, wherein the available power from the battery storage system is monitored by monitoring the current state-of-charge (SOC) within the battery storage system;

turning on the ICE to generate electrical power when the current SOC is below a lower SOC threshold or based on an operator programmed start time;

turning off the ICE when battery power is above an upper SOC threshold or when an operator programmed runtime is achieved; and controlling charging of the battery storage system by the ICE by applying a battery charging algorithm in which the upper and lower SOC thresholds are within a bulk stage of the battery system such that the battery charging algorithm only charges the battery system according to a bulk charging cycle within the bulk stage of the battery system.

34. The method of claim 33, further comprising the step of monitoring the temperature of the ICE and/or the at least one battery storage system and turning on and off a heating and/or cooling system when temperature thresholds are reached.

35. The method of claim 33, further comprising the steps of:

monitoring a current state-of-charge (SOC) within the battery storage system;

turning on the ICE to generate electrical power when the current SOC is below a lower SOC threshold;

turning off the ICE when battery power is above the upper SOC threshold or when a programmed runtime has been achieved;

directing ICE power to charge the battery system between the lower and upper SOC thresholds;

directing ICE or battery power to the light system if required, wherein the control system controls charging of the battery storage system in order to reduce ICE fuel consumption by prioritizing charging of the battery storage system between the upper and lower SOC thresholds; and initiating a maintenance charging cycle after a predetermined number of bulk charging cycles or a specific maintenance time, wherein the maintenance cycle charges the battery storage system to 100% SOC.

36. The method of claim 33, wherein charging of the battery storage system is controlled such that charging of the battery storage system is stopped prior to the battery storage system being completely charged.

37. A method for operator control of a hybrid lighting system having at least one light operatively connected to a mast system moveable between a lower and upper position, an internal combustion engine (ICE), at least one solar panel connected to the hybrid lighting system and moveable between deployed and non-deployed positions, a control system and at least one battery storage system operatively connected to a control system and ICE, the method comprising the steps of:

deploying the solar panels to a deployed position by activation of a solar panel switch connected to the control system;

deploying the mast system to an upper position by activation of a mast switch connected to control system; and activating the hybrid lighting and ICE system by an activation switch operatively connected to the control system, the activation switch having an auto-run position for activating the control system to activate the ICE based on pre-determined operational parameters and wherein the control system prevents activation of the ICE if the mast is not in an upper position.

* * * * *